(12) United States Patent
Dwyer et al.

(10) Patent No.: US 7,714,862 B1
(45) Date of Patent: May 11, 2010

(54) DIG-COLA: DIRECTED GRAPH LAYOUT THROUGH CONSTRAINED ENERGY MINIMIZATION

(75) Inventors: Tim Dwyer, Melbourne (AU); Yehuda Koren, Elizabeth, NJ (US)

(73) Assignee: AT & T Intellectual Property II, L.P., Reno, NV (US)

( * ) Notice: Subject to any disclaimer, the term of this patent is extended or adjusted under 35 U.S.C. 154(b) by 0 days.

(21) Appl. No.: 11/321,059

(22) Filed: Dec. 30, 2005

(51) Int. Cl.
*G06T 11/20* (2006.01)
(52) U.S. Cl. ...................... 345/440; 345/441
(58) Field of Classification Search .......... 345/440–441
See application file for complete search history.

(56) References Cited

OTHER PUBLICATIONS

L. Carmel, D. Harel, and Y. Koren, "Combining Hierarchy and Energy for Drawing Directed Graphs," IEEE Trans. Visualization and Computer Graphics, vol. 10, pp. 46-57, 2004.*
T. Dwyer, Y. Koren, and K. Marriott, "Stress Majorization with Orthogonal Ordering Constraints," Proc. 13th Int'l Symp. Graph Drawing (GD '05), Sep. 12-14, 2005.*
T. Dwyer and Y. Koren, "Dig-CoLa: Directed Graph Layout through Constrained Energy Minimization," Proc. IEEE Symp. Information Visualization (Infovis '05), pp. 65-72, 2005.*
Y. Koren and D. Harel, Axis-by-Axis Stress Minimization Proc. Graph Drawing (GD '03), 2003.*
Y. Koren, Graph drawing by subspace optimization, in: Proc. 6th Eurographics-IEEE TCVG Symposia on Visualization (VisSym'04), Eurographics, 2004, pp. 65-74.*
Yehuda Koren, David Harel, One-dimensional layout optimization, with applications to graph drawing by axis separation, Computational Geometry: Theory and Applications, v.32 n.2, p. 115-138, Oct. 2005.*
Eiglsperger, Markus and Siebenhaller, Martin and Kaufmann, Michael (2004) An Efficient Implementation of Sugiyama's Algorithm for Layered Graph Drawing. In Pach, János, Eds. Proceedings Graph Drawing, pages pp. 155-166, New York.*
T. Dwyer, Y. Koren, and K. Marriott, "Stress Majorization with Orthogonal Ordering Constraints," Proc. 13th Int'l Symp. Graph Drawing (GD '05), Published as Technical Report 2005/175, University of Monash, Austrilia, Aug. 2005, pp. 1-15, http://www.csse.monash.edu.au/~tdwyer/ or http://citeseer.ist.psu.edu/735896.html.*

(Continued)

*Primary Examiner*—Jin-Cheng Wang
(74) *Attorney, Agent, or Firm*—Greenblum & Bernstein, P.L.C.

(57) ABSTRACT

A method and system for drawing directed graphs including receiving data coordinates associated with nodes for graphing, performing a constrained stress minimization, and outputting results of the constrained stress minimization and displaying the results on a visual medium. The described method may take the form of instructions residing on a computer readable medium. The described method and system may be utilized for drawing directed graphs in a very wide range of applications ranging from gene networks, to flowcharts, to display of relational characteristics of breakfast cereal and so on.

20 Claims, 27 Drawing Sheets

OTHER PUBLICATIONS

T. Dwyer, Y. Koren and K. Marriott, "Stress Majorization with Orthogonal Ordering Constraints", Proceedings of 13th Int. Symp. Graph Drawing (GD'05), Lecture Notes in Computer Science, vol. 3843, Springer Verlag, pp. 141-152, 2005.*

L. Carmel, D. Harel, Y. Koren, "Combining Hiearchy and Energy for Drawing Directed Graphs", IEEE Transactions on Visualization and Computer Graphics, vol. 10, No. 1, pp. 46-57, Jan.-Feb. 2004.*

E.R. Gansner, Y. Koren and Stephen North, "Graph Drawing by Stress Majorization," Graph Drawing, pp. 239-250, 2004.*

W. He, K. Marriott "Constrained Graph Layout", Symp. On Graph Drawing, GD '96, vol. 1190 of Lecture notes in Computer Science, Springer, 1996, pp. 217-232.*

E. Gansner, Y. Koren and S. North, "Graph Drawing by Stress Majorization", Proc. 12th Int. Symp. Graph Drawing (GD'04), LNCS 3383, Springer Verlag, pp. 239-250, 2004.

* cited by examiner

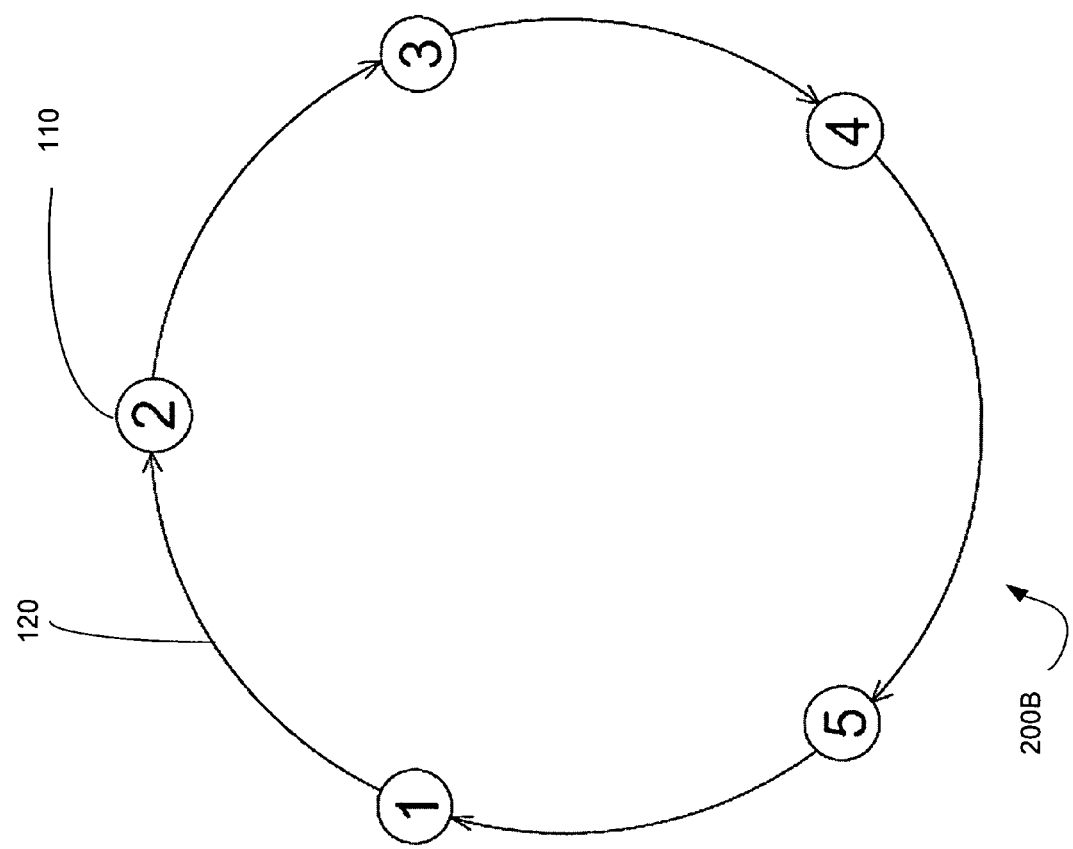
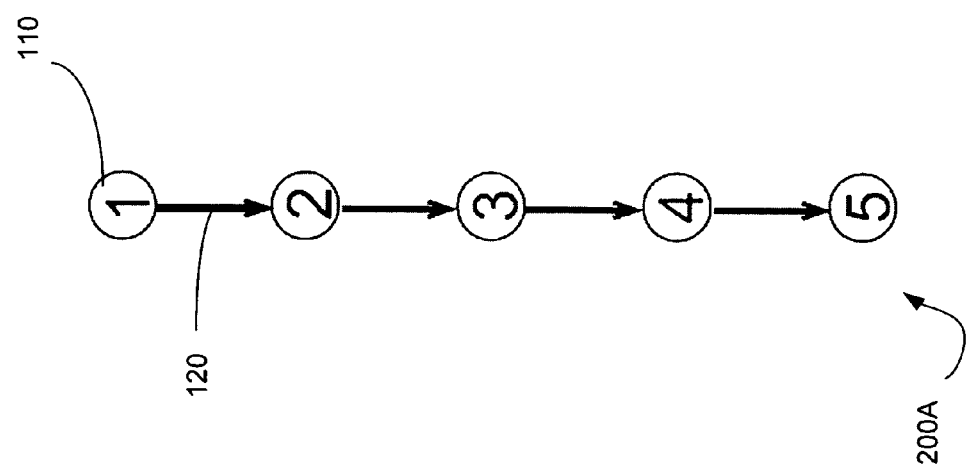
Figure 2B
Figure 2A

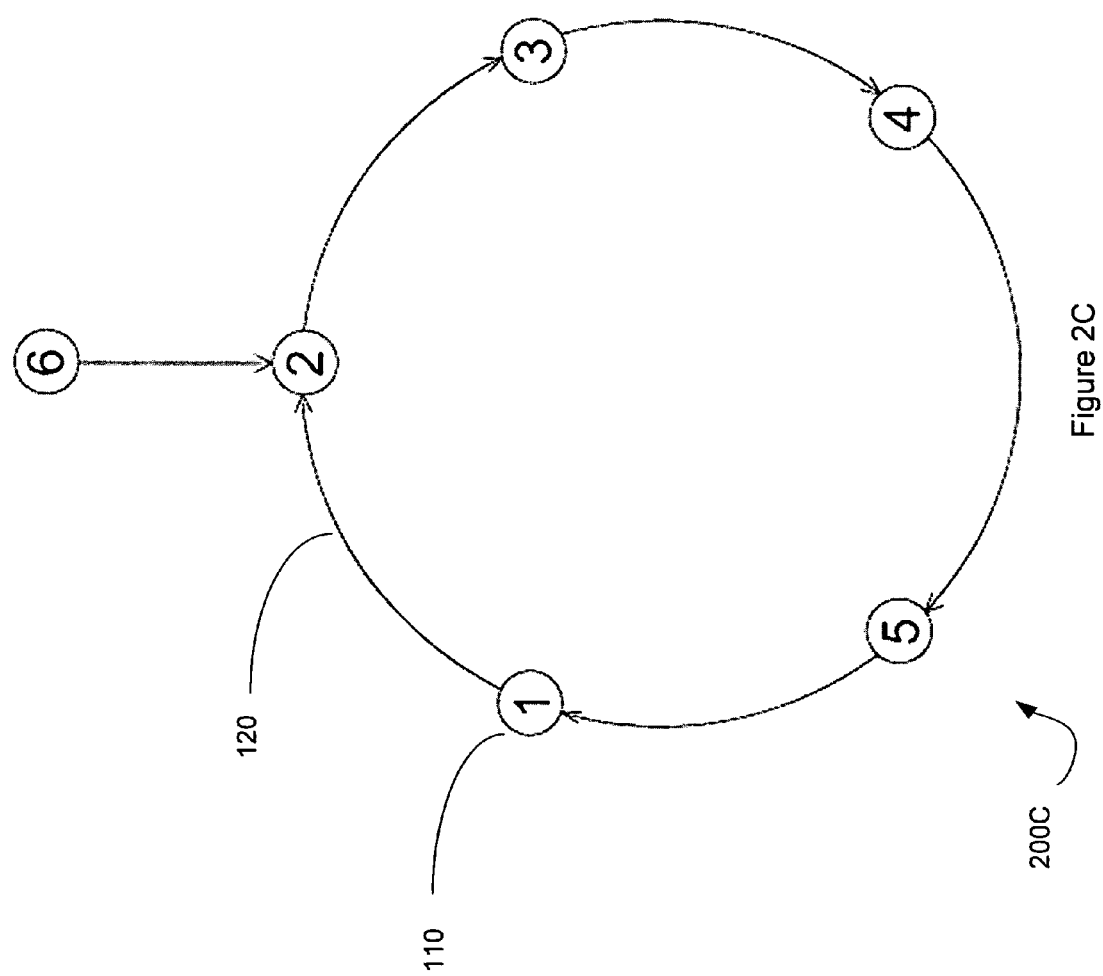

DIG-COLA: DIRECTED GRAPH LAYOUT THROUGH CONSTRAINED ENERGY MINIMIZATION

FIELD OF THE INVENTION

The invention relates generally to methods for constructing graphs. More specifically, the invention provides a method for drawing directed graphs.

BACKGROUND OF THE INVENTION

Techniques for drawing digraphs are known. For example, FIG. 1A illustrates a graph drawn with one known algorithm by Sugiyama. [See K. Sugiyama, S. Tagawa and M. Toda, "Methods for Visual Understanding of Hierarchical Systems", *IEEE Trans. Systems, Man, and Cybernetics* 11 (1981), 109-125]. In the Sugiyama algorithm, the y-coordinates are computed by dividing the y-axis into a finite number of layers and associating each node with exactly one layer. Edges between nodes on the same layer are not allowed and edges spanning multiple layers are split into chains of dummy nodes. Layer assignment is usually computed with the goal of minimizing edge-length (and hence the number of dummy nodes). The layer assignment methods used are generally incapable of handling cyclic-digraphs and so preprocessing is required to make the graph acyclic by reversing a minimal number of edges. Assigning the x-coordinates is normally done in two stages: first ordering nodes within layers to minimize crossings and then exact placement subject to the computed ordering to optimize aesthetic criteria such as minimizing edge bends. Each of the optimization problems outlined above has been shown to be NP-hard so heuristic approaches have been designed that offer reasonable results in most cases.

Carmel et al. see e.g., L. Carmel, D. Harel and Y. Koren, "Combining Hierarchy and Energy for Drawing Directed Graphs", IEEE Trans. Visualization and Computer Graphics 10 (2004), 46-57, is an other known approach to drawing digraphs. In this approach, the nodes are associated with continuous y-coordinates, in a way that can be applied to any kind of digraph, whether cyclic or acyclic, and which requires no graph modification or preprocessing. These y-coordinates are the unique minimizer of the hierarchy energy, which strongly reflects the directional information of the digraph. The x-coordinates are the minimizer of another energy function that disregards all directional information. The main characteristics of this method are its ability to deal with cyclic graphs, the fact that nodes are not partitioned into horizontal layers and the very fast execution. However, although solutions are defined for graphs with cycles, so-called symmetric nodes within cycles are by definition considered to be at the same hierarchy level and are thus assigned the same y-coordinate. The resulting drawings make such cycles difficult to see, see, e.g., FIG. 5B.

Currently, a need exists for an improved method and system for constructing graphs including digraphs.

BRIEF SUMMARY OF THE INVENTION

To overcome limitations in the prior art described above, and to overcome other limitations that will be apparent upon reading and understanding the present specification, the present invention is directed to a method and system for drawing directed graphs.

A first aspect of the invention provides a method and system for drawing directed graphs including receiving data coordinates associated with nodes for graphing, performing a constrained stress minimization, and outputting results of the constrained stress minimization and displaying the results on a visual medium.

A second aspect of the invention provides a method for drawing directed graphs including receiving data associated with nodes for graphing, assigning hierarchical levels to the nodes for graphing, minimizing a stress function constrained by the assigned hierarchical levels, and outputting results of the step of minimizing a stress function constrained by the assigned hierarchical levels and displaying the results in a layout on a visual medium.

A third aspect of the invention provides a computer readable medium containing instructions for performing the steps of receiving data associated with nodes for graphing, assigning hierarchical levels to the nodes for graphing, minimizing a stress function constrained by the assigned hierarchical levels, and outputting results of the step of minimizing a stress function constrained by the assigned hierarchical levels and displaying the results in a layout on a visual medium.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 2A, 2B and 2C illustrate varying degrees of hierarchy associated with digraphs.

DETAILED DESCRIPTION OF THE INVENTION

Figure 1A:
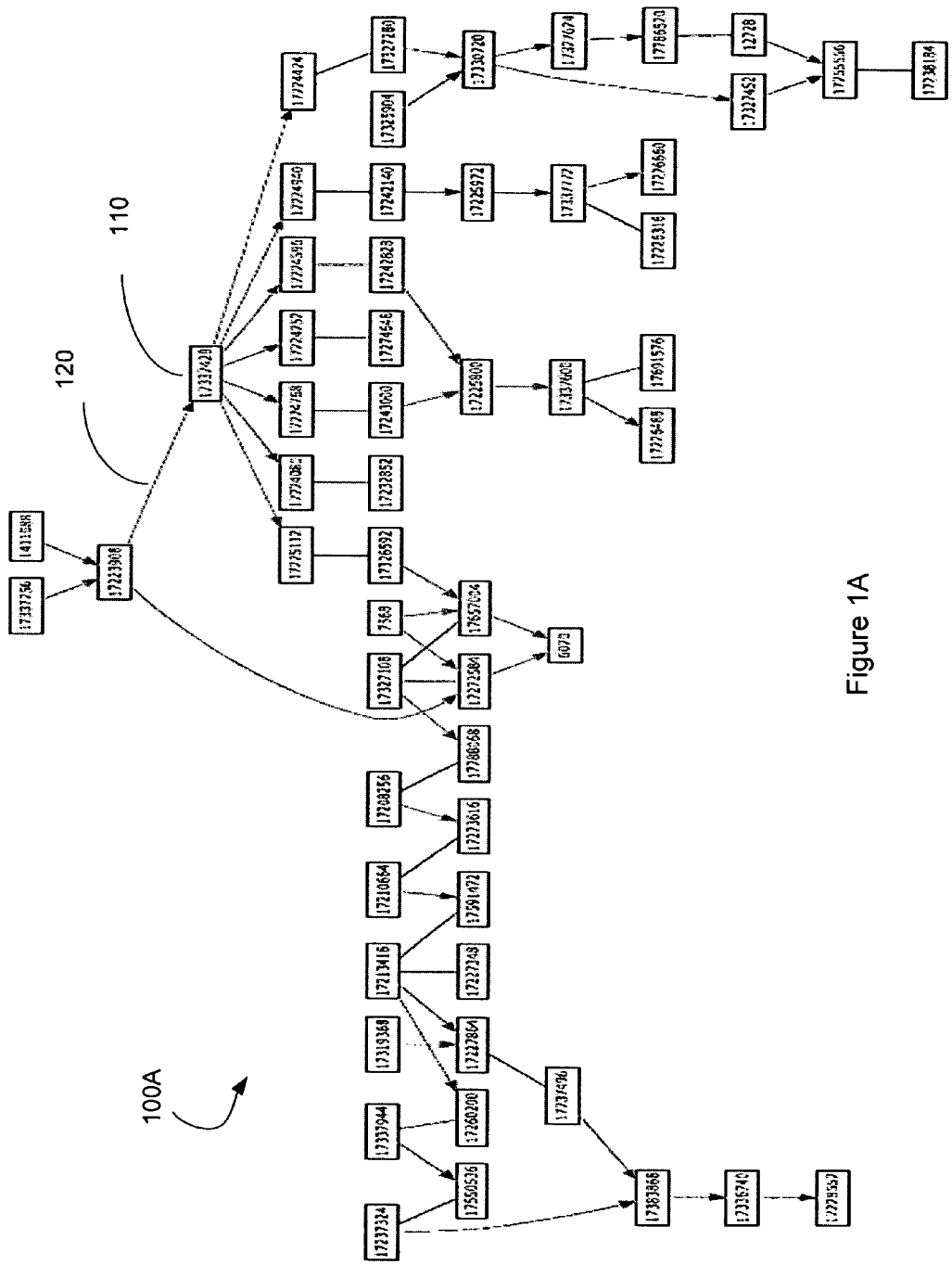
FIGS. 1A and 1B illustrate directed graphs constructed with a hierarchical and undirected layout respectively.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

A new method for constructing directed graphs is described herein. This new method and associated system for constructing directed graphs may be described for illustrative purposes as directed graph drawing through constrained layout optimization. For clarity and ease of reference, the system and method may be referred to as such throughout. Additionally, the described method and system may also be referred to for ease of reference as "DIG-COLA."

For reference, "graph" is used herein to refer to the abstract relational structure. For example, the method described herein will receive an input in various forms and the method visualizes or draws the graph. The input may vary greatly in characteristic and the described methods and systems may be utilized in numerous industry, business and technology sectors. Similarly, an enormous variety of data may be visualized using the described methods ranging from gene networks, to engineering flow diagrams, to breakfast cereal characteristics and on and on. Additionally, several non-limiting examples of "drawing" as used herein includes displaying on a computer monitor or printing on paper.

The new approach introduced is distinguished from those above for example by the fact that it does not separate the computation of the various axes, but computes all axes simultaneously using constrained energy minimization. The method described herein generally define a cost function (or a force model) whose minimization generally produces an acceptable node placement. Any use of a Force Directed Placement (FDP) for drawing directed-graphs in a general sense has up until now specifically included the force model being extended by 'angle forces' that encourage all directed edges to point in the same direction. However, this requirement adds additional complexity to the force model and the inferred energy function is complicated, and thus prone to numerical stiffness and rich in local minima.

The method and system described herein possess the advantages of both constraint programming techniques and a state-of-the-art force-directed placement (FDP) algorithm so that the directed nature of the graph is highlighted while useful properties of FDP—such as emphasis of symmetries and preservation of proximity relations—are retained. The described method automatically identifies those parts of the digraph that contain hierarchical information and draws them accordingly. Additionally, those parts that do not contain hierarchy are drawn at the same quality expected from a non-hierarchical, undirected layout algorithm. One illustrative application of the described method is directional multidimensional scaling (DMDS). DMDS deals with low-dimensional embedding of multivariate data where we want to emphasize the overall flow in the data (e.g. chronological progress) along one of the axes.

Current graph drawing methods convert the relational structure of a graph (or network) to a diagram. Many of the known approaches to graph drawing have been developed for specific types of graphs and different application domains. One type of known graph is referred to as a digraph. Drawing digraphs is a challenging task, requiring methods that faithfully represent the relative connectivity of the nodes as well as giving some sense of the overall directionality of the connections (edges). The latter requirement renders methods designed for undirected graph drawing inappropriate for digraphs. One known digraph-drawing strategy, involves assigning x and y coordinates in separate stages with different objectives. Thus, the y-axis represents the directional information, or hierarchy, and the x-axis placement is adjusted for additional aesthetic considerations such as minimizing edge crossings.

Figure 1B:
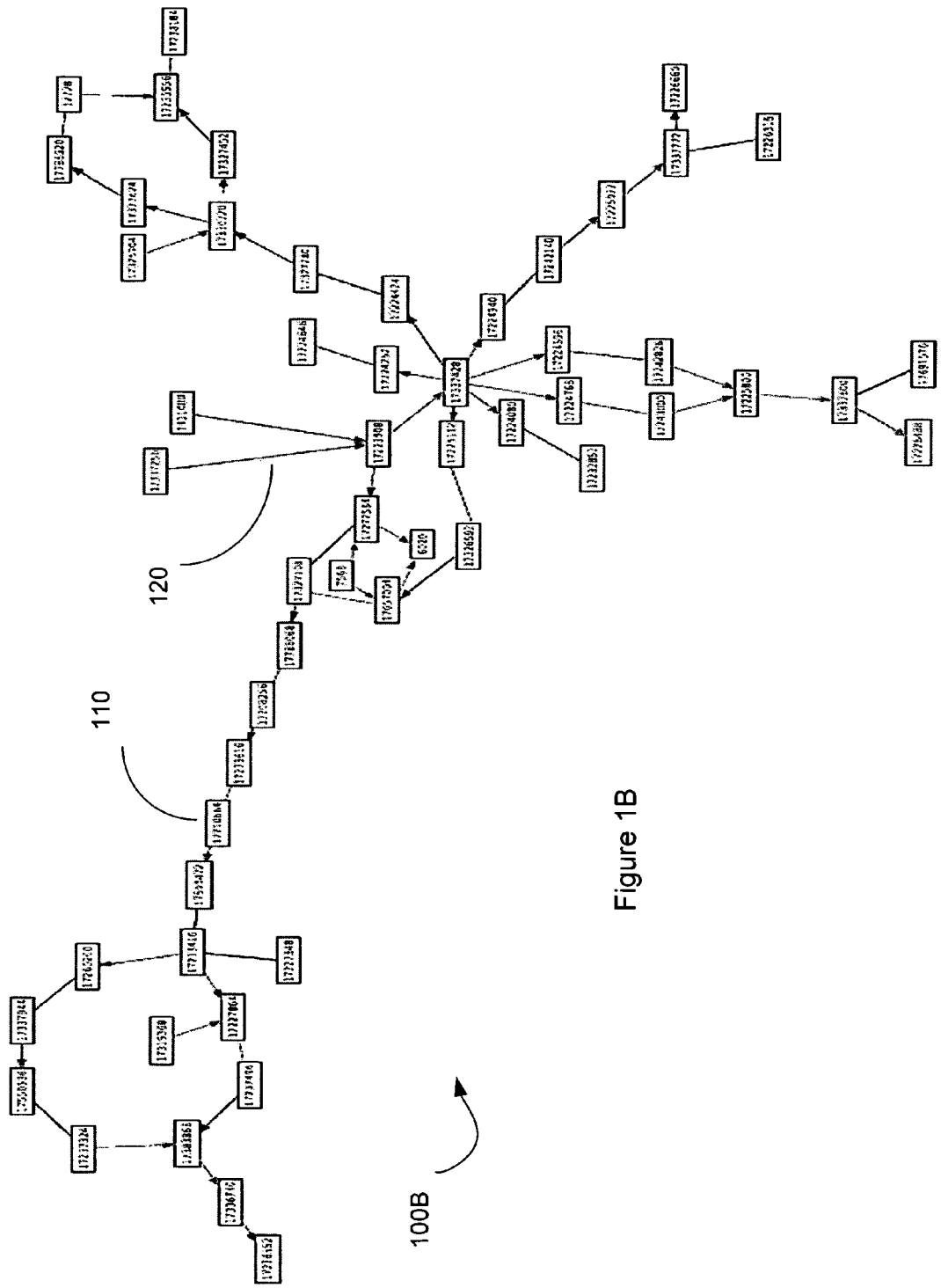

The special attributes of digraph layouts are demonstrated in FIGS. 1A and 1B with two different layouts of the structure of a small gene expression network. FIG. 1A illustrates a digraph 100A drawn by conventional methods while FIG. 1B illustrates a digraph 100B based upon the same originating data as that used to draw FIG. 1A, however a force directed layout was used to construct FIG. 1B. Each node 110 in the network represents a gene and a directed edge 120 indicates that the source gene affects the expression of the target gene (i.e. by binding the product of one gene to the promoter region of another gene). Undirected (or bidirected) edges (i.e. edges for which no preferred directionality should be shown) are shown without an arrow end. Otherwise, edge direction is shown with an arrow. Hierarchical layout places the genes from top to bottom in activation order. The undirected layout could be considered clearer (with fewer edge crossings, more consistent edge length and arguably better representation of cycles, clusters and symmetry) but it gives no indication of the chronological order of interactions.

Following the common convention, one of the axes is dedicated to conveying hierarchical information. However, the usual axis separation approach is not pursued in FIG. 1B. Separate computation of different axes can be appealing as it allows a convenient divide-and-conquer strategy. However, such a separation can make it difficult to control common aesthetic properties in the resulting drawing. Prime examples are uniformity of edge lengths (preventing very long edges) or balancing aspect ratio (equal spread along the x and y-axes).

Hence, a method is proposed for constrained layout of digraphs (DIG-COLA) where all axes of the layout are computed simultaneously as in standard undirected approaches. This process is made feasible by combining two optimization techniques: majorization and quadratic programming. As described herein, a new approach to drawing digraphs is described.

Preliminary Notions

A digraph G=(V,E) comprises a set V={1, . . . , n} of n nodes, and a set E of directed edges where (i,j)∈E is an edge from node i to node j. Each edge (i,j) is further associated with a number $\delta_{ij}$ that expresses the relative hierarchy of the nodes. Usually, $\delta_{ij}=1$ for a directed edge i→j, meaning that i precedes j by one unit. Similarly, $\delta_{ij}=0$ for any undirected edge, meaning that there is no hierarchical precedence between i and j. A d-dimensional layout is denoted by an n×d matrix X. Thus, node i is located at $X_i \in \mathbb{R}^d$ and the axes of the layout are $X^{(1)}, \ldots, X^{(d)} \in \mathbb{R}^n$.

Stress Function: The stress function is a traditional measure of drawing quality, based on the heuristic that a nice drawing relates to good isometry: i.e. it calls for placing the nodes so that the resulting pairwise Euclidean distances will approach the corresponding target distances (e.g. graph-theoretical distances). Specifically, we have an ideal distance $d_{ij}$ for every pair of nodes i and j exists, modeled as a spring. Given a d-D layout, where node i is placed at point Xi, the energy of the system is $$\text{stress}(X) = \sum_{i<j} w_{ij}(\|X_i - X_j\| - d_{ij})^2. \quad (1)$$

A layout that minimizes this function is desired, thereby best approximating the target distances. Here, the distance $d_{ij}$ is typically the graph-theoretical distance between nodes i and j (i.e. the length of the shortest path connecting i and j). The normalization constant $w_{ij}$ equals $d_{ij}^{-\alpha}$. Various values for $\alpha$ may be chosen. For example, $\alpha=2$, $\alpha=0$, and $\alpha=1$ are all potential values that may be used. Additionally, one may set $d_{ij}$ to the linear-network distance. This may assist in conveying any clustered structure in the graph. For purposes herein, one exemplary embodiment is used herein. Hereafter $\alpha=2$ is used.

Stress majorization: One may also compute a graph layout by minimizing the stress function through majorization, following works in the field of multidimensional scaling. Majorization is a rather global optimization process offering some distinct advantages over localized processes like gradient descent—especially guaranteed monotonic decrease of stress, improved robustness against local minima and shorter running times. Majorization minimizes the stress function by iteratively minimizing quadratic forms that approximate and bound it from above. Recall that $w_{ij}$ are the normalization constants in the stress function. The n×n matrix $L^w$ is used, defined by $$L_{i,j}^w = \begin{cases} -w_{ij} & i \neq j \\ \sum_{k \neq i} w_{ik} & i = j \end{cases}. \quad (2)$$

In addition, given an n×d coordinate matrix Z, the n×n matrix is defined by $L^Z$ by $$L_{i,j}^Z = \begin{cases} -w_{ij} \cdot d_{ij} \cdot inv(\|Z_i - Z_j\|) & i \neq j \\ -\sum_{k \neq i} L_{i,k}^Z & i = j \end{cases}, \quad (3)$$

where $inv(x)=1/x$ when $x \neq 0$ and 0 otherwise. It can be shown that the stress function is bounded from above by the quadratic form $F^Z(X)$ defined as $$F^Z(X) = \sum_{i<j} w_{ij} d_{ij}^2 + \sum_{a=1}^{d} \left((X^{(a)})^T L^w X^{(a)} - 2(X^{(a)})^T L^Z Z^{(a)}\right). \quad (4)$$

Thus, we have $$\text{stress}(X) \leq F^Z(X) \quad (5)$$

with equality when Z=X. Differentiate by X and find that the global minima of $F^Z(X)$ are given by solving $$L^w X^{(a)} = L^Z Z^{(a)}, \, a=1, \ldots, d. \quad (6)$$

This leads to the following iterative optimization process. Given some layout X(t), we compute a layout X(t+1) so that stress(X(t+1))≤stress(X(t)). One may use the function $F^{X(t)}$ (X) which satisfies $F^{X(t)}(X(t))=\text{stress}(X(t))$. Takes X(t+1) as the minimizer of $F^{X(t)}(X)$ by solving $$L^w X(t+1)^{(a)} = L^{X(t)} X(t)^{(a)}, \, a=1, \ldots, d. \quad (7)$$

At this point, the process is terminated if $$\Delta\text{stress} = \frac{\text{stress}(X(t)) - \text{stress}(X(t+1))}{\text{stress}(X(t))} < \varepsilon, \quad (8)$$

Otherwise, we set t←t+1 and continue lowering the stress.

Hierarchy energy: The hierarchy energy strongly reflects the directional information of the digraph. Let G(V,E) be a digraph, and let $y=(y_1, \ldots, y_n)^T$ be any vector of coordinates. The hierarchy energy is $$E_H(y) = \sum_{(i,j) \in E} (y_i - y_j - \delta_{ij})^2. \quad (9)$$

An optimal arrangement of a digraph, y*, is defined as a minimizer of the hierarchy energy. It will try to place the nodes such that the height difference $y_i - y_j$ for any adjacent pair (i,j) will be close to $\delta_{ij}$, the relative hierarchy (i,j). This optimal arrangement is given by solving the linear equations $$deg_i \cdot y_i = \sum_{j:(i,j) \in E} (y_j + \delta_{ij}) + \sum_{j:(j,i) \in E} (y_j - \delta_{ji}), \, i = 1,$$

where $deg_i = |j:(i,j) \in E| + |j:(j,i) \in E|$.

The optimal arrangement shows the height of each node in the hierarchy as induced by the digraph structure.

Dig-Cola Method

Figure 17:
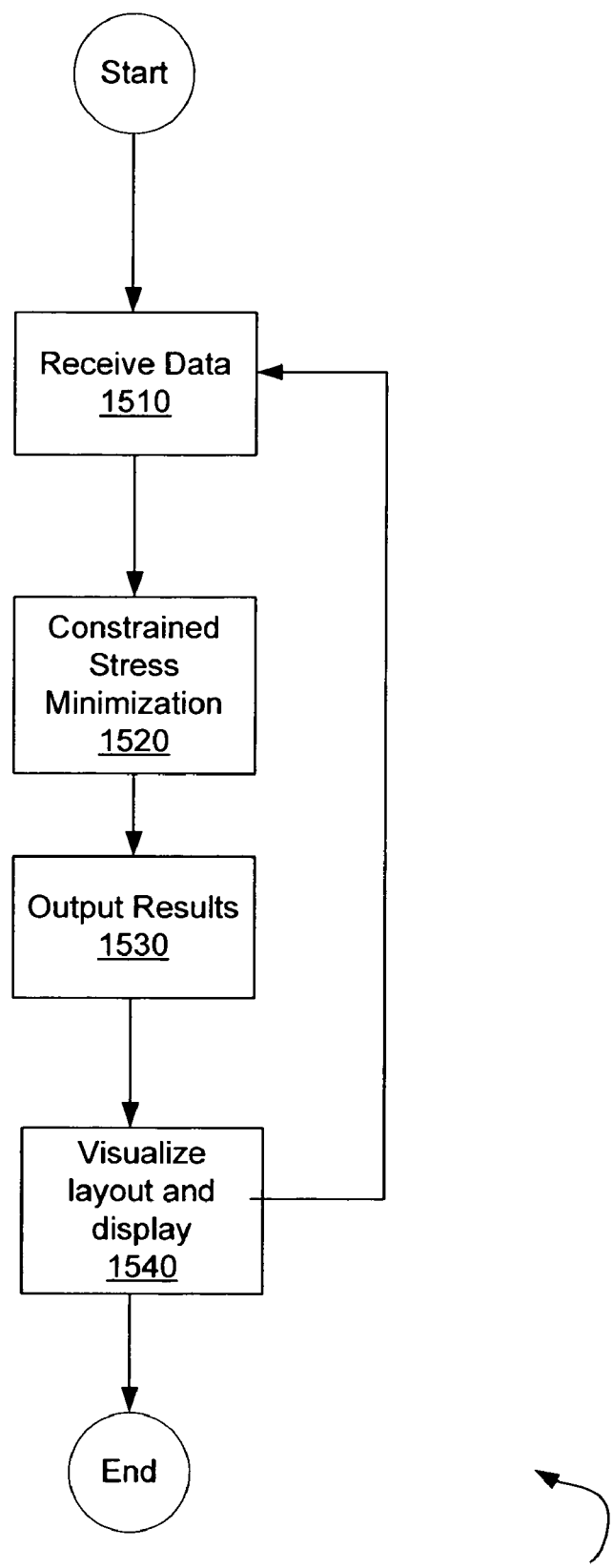
FIG. 17 illustrates a diagram of an exemplary embodiment of the DIG-COLA method.

The described methods and systems have numerous embodiments. FIG. 17 illustrates a flowchart showing a general flow of steps in one exemplary embodiment of the described method. Numerous specific embodiments have been considered and are consistent with the method described herein. Describing the method illustrated in FIG. 17 briefly, a first step includes receiving data 1510 at a certain location typically associated with nodes for potential display in a graph. Next, constrained stress minimization 1520 consistent with the features and substeps described is performed. Next, the results from the constrained stress minimization is output 1530. Finally, a layout is visualized or displayed 1540. The digraphs displayed in step 1540 may be displayed on any of known medium for display of graphs and other pictorial items. For example, among the medium considered are monitors, printed paper, projection etc.

Figure 18:
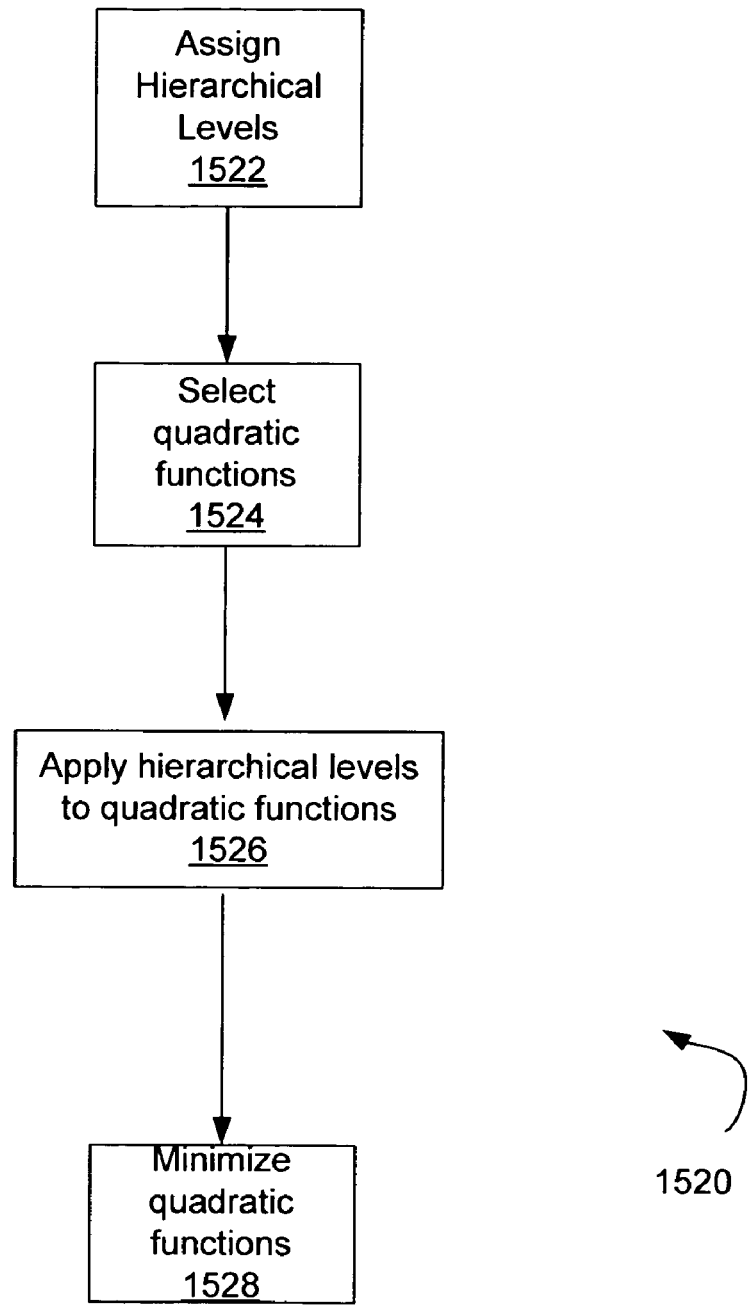
FIG. 18 illustrates a diagram of another exemplary embodiment of the DIG-COLA method.

In conjunction with illustrative FIG. 17, FIG. 18 illustrates some substeps of the embodiment described in FIG. 18. Specifically, FIG. 18 shows substeps included in one embodiment of the constrained step minimization 1520. First, hierarchical levels as described later are specifically assigned to each of the nodes. Multiple nodes may be placed in a given hierarchical level. Additionally, in certain embodiments, or portions of embodiments, only one node will be placed in s hierarchical level. Next, quadratic functions are selected 1526 depending on specific characteristics involved. Then, these selected quadratic functions are minimized. Next, in the illustrative embodiment of FIGS. 17 and 18, the results would be displayed as shown in the flowchart of FIG. 17. The specifics of the described process are elaborated in more detail below.

Speaking generally, the described method follows in a tradition of drawing undirected graphs by minimizing a stress or energy function. However, since we want to show the overall directionality of the graph, constraints are imposed on the layout.

Hierarchy as constraints: Generally, a digraph can be said to induce a hierarchical structure on its nodes based on the precedence relationships defined by its directed edges. Consequently, an appropriate depiction of a digraph allocates one of the axes to showing this hierarchy. Henceforth, the y-axis will serve for this exemplary purpose. Thus, if node i precedes node j in the hierarchy, then i will be drawn above j on the y-axis. This usually leads to the majority of directed edges pointing downwards, thereby showing a clear flow from top to bottom. Accordingly, since most of the directed edges point downwards, this downwards direction may be referred to as a primary direction of orientation of the edges. The primary direction of orientation typically includes the general direction of orientation of the edge. For example, an edge oriented generally downward but also some amount to the left may be considered to possess a primary direction of orientation of downward.

Accordingly, in one exemplary embodiment of the described method, our first step is to compute the hierarchy induced by the digraph. This hierarchy is expressed by partitioning the node set into k disjoint sets: $V = \mathcal{L}_1 \cup \mathcal{L}_2 \cup \ldots \cup \mathcal{L}_k$, so that if i<j then the nodes in $\mathcal{L}_i$ precede those in $\mathcal{L}_j$ in the hierarchy. Here $1 \leq k \leq n$ is a value depending on the graph properties. Henceforth, these sets may be referred to as "hierarchical levels" or just "levels". Consequently, the directional properties of the digraph are expressed by imposing hierarchy constraints: for all $1 \leq i \leq j \leq k$ place all nodes of $\mathcal{L}_i$ than those of $\mathcal{L}_j$ in the y-axis.

Note that the hierarchical levels strongly depend on the digraph structure. For example, FIG. 2 illustrates digraphs 200A, 200B, and 200C, each possessing varying degrees of hierarchy. In FIG. 2A, one would like to say that node 1 precedes node 2, which precedes node 3 and so on. Hence, a reasonable partition would be into 5 levels where $\mathcal{L}_1 = \{1\}$, $\mathcal{L}_2 = \{2\}$, $\mathcal{L}_3 = \{3\}$, $\mathcal{L}_4 = \{4\}$, $\mathcal{L}_5 = \{5\}$. If we add only a single edge, from node 5 to node 1 we get the graph in FIG. 2B. For this graph, all nodes are symmetric, and none precedes any other in the hierarchy. Hence, unless we have some external information, it would be safe to assume that no hierarchy exists here and we must assign all nodes to a single level $\mathcal{L}_1 = \{1, 2, 3, 4, 5\}$. A third case with one additional node is shown in FIG. 2C. In this case, an agreeable partitioning is $\mathcal{L}_1 = \{6\}$ and $\mathcal{L}_2 = \{1, 2, 3, 4, 5\}$.

How do we get such a partitioning? Sometimes external information regarding the hierarchical order of the nodes is available or received. For example, if the nodes are associated with chronological data, we can partition them by years. If we know that one special node is the "root", then distance from it might dictate the hierarchical levels. Another possibility is to use the layering phase of Sugiyama-based methods, for partitioning the nodes into different levels.

A default choice is to base the partition on the optimal arrangement y*, which was previously defined. This allows us to deal with all digraphs, including those that are cyclic or those that also include undirected edges. An advantageous property of the optimal arrangement is that it will not introduce hierarchy that is not induced by the graph structure. This is very important, as we don't want to impose any unjustified constraint on the layout. For example, for the digraph in FIG. 2B, all nodes will be assigned the same position in y* meaning that there are no hierarchical constraints; whereas for the digraph in FIG. 2C all nodes except node 6 will be assigned the same y* position, yielding a constraint stating that node 6 should be placed above all other nodes. In principle, we could sort nodes by their positions in y* and place each node in a separate level. However, this might produce an excessive number of levels and therefore excessive constraints. Hence, we compute the hierarchical levels by clustering nodes according to the same level of hierarchy. This is a one-dimensional clustering problem that we solve using the Single Link approach. We sort y* and split it where we observe significant gaps, i.e. if $y^*_i$ is significantly larger than $y^*_{i+1}$, then nodes i and j are assigned to different levels. Detailed pseudocode for this algorithm is given below.

Function PartitionToLevels $\{G(V=\{1, \ldots, n\}, E)\}$
% Partition the nodes into levels reflecting hierarchy
    % Constants controlling number of levels:
    $\alpha \leftarrow 0.1, \beta \leftarrow =0.01$ % lower values encourage more levels
    Compute the optimal arrangement $y^* \in \mathbb{R}^n$
    % Sort according to y*:
    Compute a permutation $1 \leq v_1, \ldots, v_n \leq n$, so that $y^*_{v_i} \geq y^*_{v_i} \geq y^*_{v_{i+1}}$ $$\varepsilon \leftarrow \text{Max}\left(\alpha \frac{1}{n-1} \sum_{i=1}^{n-1} (y^*_{v_i} - y^*_{v_{i+1}}), \beta\right)$$

Figure 3:
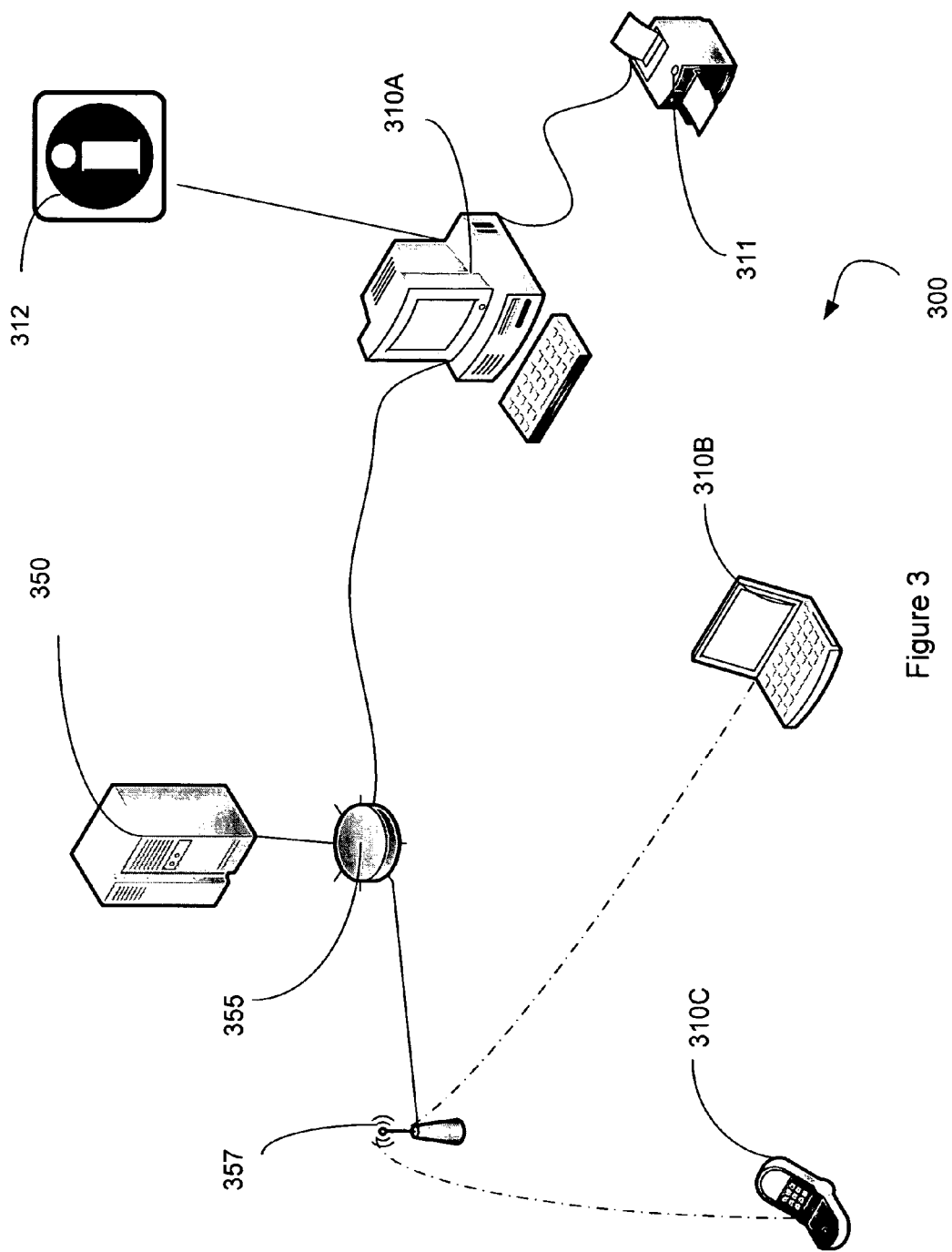
FIG. 3 illustrates an exemplary embodiment of a system for constructing directed graphs.

$k \leftarrow 1$
    for i=1 to n−1 do
        $\mathcal{L}_k \leftarrow \mathcal{L}_k \cup \{v_i\}$
        if $y^*_{v_i} - y^*_{v_{i+1}} > \varepsilon$ then
            % A new level based on a significant gap in y*:
            $k \leftarrow k+1$
        end if
    end for
    $\mathcal{L}_k \leftarrow \mathcal{L}_k \cup \{v_n\}$
    return $\mathcal{L}_1, \mathcal{L}_2, \ldots, \mathcal{L}_k$ FIG. 3 is a diagram of an illustrative computer network system 300 for implementing the DIG-COLA method. The components depicted here are merely illustrative and a vast number of computers, software, network and related modules may be form a system implementing DIG-COLA. For example, 310A and 310B illustrate desktop and laptop computers. Numerous similar terminals may be utilized. In these illustrative embodiment computers 310A and 310B are communicably connected to a server 350 via a router 355. Desktop computer 310A is connected via Ethernet or hard wire and laptop computer is connected to the server via a wireless access point 357. Additionally, a wide array of devices, hardware, and processors may be utilized in the system. Computer 310A is connected and interfaces with a sensor system 312 that obtains data, meanwhile printer 311 is configured to print out for display information and data located on computer 310A. Additionally, PDAs and cellular phone type devices 310C are among devices potentially used with the described system. While one embodiment of a system for DIG-COLA is illustratively described, a wide variety of devices, processors and computing machines and network may be utilized.

Iterative quadratic programming It is desired to find a layout minimizing the stress function subject to the hierarchy constraints. One option considered was the addition of general linear constraints to FDP based on the localized Kamada-Kawai approach. However, constraint can be better integrated into the more global majorization optimization process described. This smooth integration is made possible by using quadratic programming. Recall that stress majorization involves minimizing a series of quadratic forms in a way that guarantees a monotonic decrease of stress. To address the directional information, we must also consider the hierarchy constraints, which are certainly linear. Hence, in each iteration a quadratic function is minimized subject to linear constraints. It can be shown that the minimized quadratic functions are positive definite (further described below). Such a constrained optimization is commonly called convex quadratic programming. It is well known that the global minimizer of a convex quadratic program can be computed efficiently. To summarize, when integrating stress majorization with level constraints, for each iteration a convex quadratic program is solved, instead of minimizing a quadratic function. While solving convex quadratic programs is more involved than just minimizing quadratic functions, optimal solutions can efficiently be obtained using a variety of available solvers. Notably, the majorization process, which must obey all constraints, still monotonically decreases the stress function and hence is convergent. In more detail, suppose a given initial layout $X(0) \in \mathbb{R}^{n \times d}$. Then in the t-th iteration compute layout X(t) as the solution of the quadratic program:

$$\min_X \sum_{a=1}^d \left( (X^{(a)})^T L^w X^{(a)} - 2(X^{(a)})^T L^{X(t-1)} X(t-1)^{(a)} \right) \quad (10)$$

$$\text{subject to}: \forall\, j \in \mathcal{L}_i : X_j^{(1)} \geq l_i, \quad i = 1, \ldots, k-1$$

$$\forall\, j \in \mathcal{L}_{i+1} : X_j^{(1)} + G \leq l_i, \quad i = 1, \ldots, k-1.$$

Note that the target function is the same as in the usual majorization process defined in (4). The sets $\mathcal{L}_1, \ldots, \mathcal{L}_k$ are the hierarchical levels that were defined in the previous subsection. The column $X^{(1)} \in \mathbb{R}^n$, is the axis that represents the hierarchical information (the y-coordinates in our examples). Further, k−1 auxiliary variables $l_1, l_2, \ldots l_{k-1}$ are used for expressing the constraints succinctly: $l_i$ must be below the nodes in $\mathcal{L}_i$ but above the nodes of $\mathcal{L}_{i+1}$. The matrices $L^w$ and $L^{X(t-1)}$ were defined in (2) and (3), respectively. Note that $L^w$ and the constraints are fixed during the entire process. The constant G is the minimum gap between consecutive hierarchical levels. In the described exemplary embodiment the default value is G=0.1. One terminates the process when the stress level stabilizes, i.e. when $\Delta\text{stress} < \epsilon$, as defined in Eq. (8). A typical value for $\epsilon$ is 0.01.

Figure 4B:
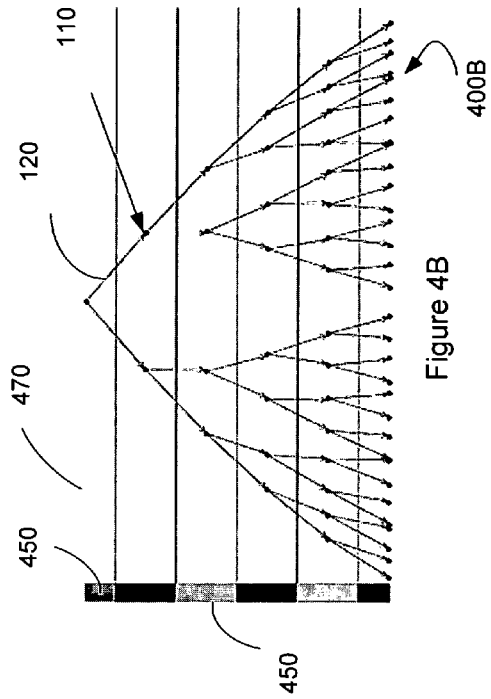
FIGS. 4A, 4B, 4C, and 4D illustrate exemplary embodiments of hierarchy shown with bands.
Figure 4D:
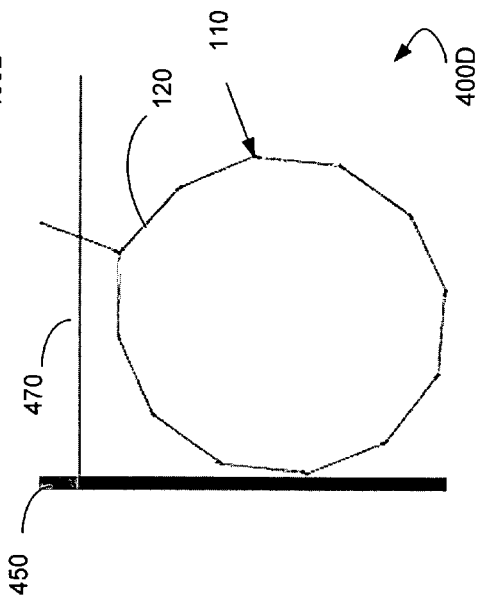
Figure 4A:
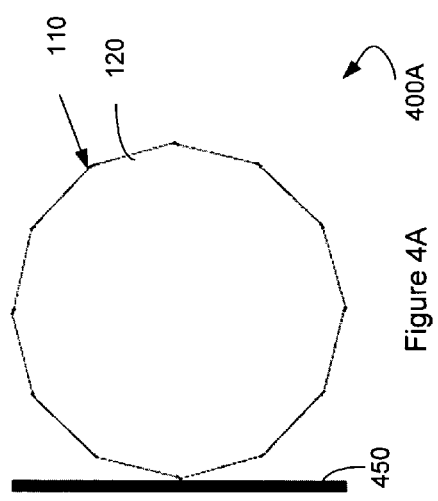
Figure 4C:
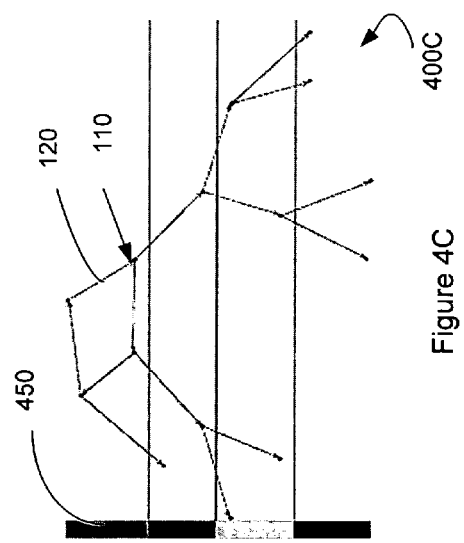
Figure 6A:
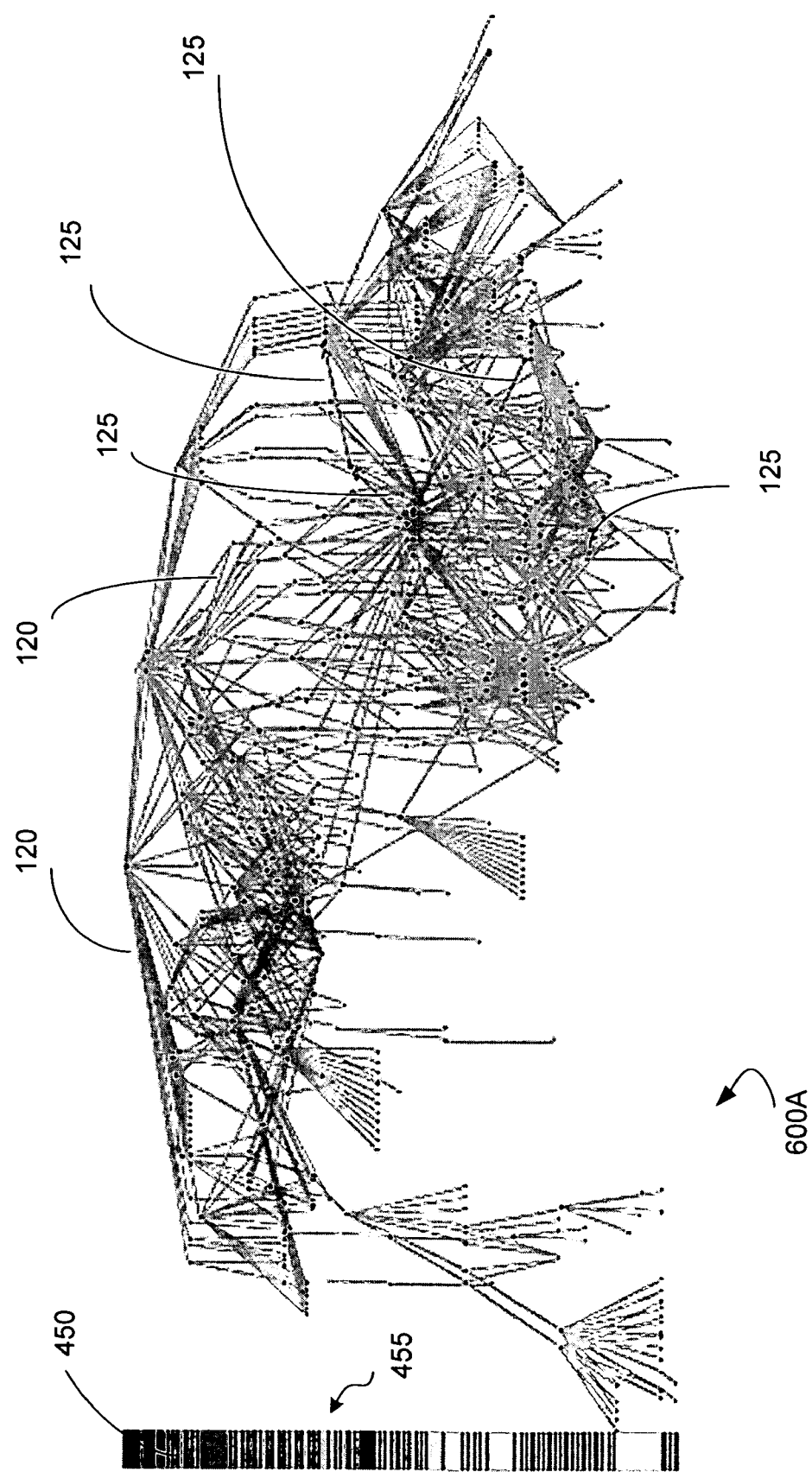
FIG. 6A illustrates an embodiment of a directed graph constructed by DIG-COLA.

Visual conventions A layout produced by our algorithm can be partitioned into horizontal bands, each band 470 (as seen in several Figures including FIGS. 4B and 4D) containing all nodes belonging to a single hierarchy level. The described bands decompose the $X^{(1)}$-axis (usually the y-axis) into the intervals $[-\infty, l_1], [l_1, l_2], [l_2, l_3], \ldots, [l_{k-1}, \infty]$. The sizes of the bands are non-uniform and depend on the computed layout, which reflects the graph structure. The reason these bands are of interest is that all nodes in the same band are considered to have the same level in the hierarchy. Thus, some layouts are comprised of many narrow bands and hence contain much hierarchy, whereas some other graphs do not contain much hierarchy so their layouts are composed of a very few bands. In satisfying the quadratic program, the method will usually create broader bands for levels containing larger portions of the graph. In order to show this information, we let the user see the underlying bands in the form of a narrow vertical bar 455 (see e.g. FIG. 6A) that is placed to the left of the graph drawing. This bar contains a sequence of colored blocks 450 corresponding to the bands. In an illustrative embodiment, the colors gradually change from red to green from top to bottom. To allow users to easily differentiate between consecutive bands, an alternative between saturated and unsaturated colors may be utilized. Unsaturated colors typically include a color not diluted with white, a pure unmixed color. Thus, node color can be used to display other attributes, as demonstrated in FIG. 13. Various of these described features of the described graphs are apparent in numerous of the Figures and the features serve a number of functions including facility use, understanding and visualization by a reader/viewer.

An example showing bands for a few small graphs is given in FIG. 4. In FIG. 4A a digraph 400A with a directed circle is shown. Such a digraph contains no hierarchy and hence all layout is within a single band. In fact, when drawing such a graph, DIG-COLA generates no constraints and so it becomes equivalent to undirected stress minimization algorithms. In FIG. 4B a digraph 400B with a directed tree is shown. Each level of the tree is placed within a separate band yielding six bands. Another "tree" with the root replaced by a directed cycle is shown in digraph 400C in FIG. 4C. The cycle is contained within the top band, while the remaining nodes are partitioned into bands according to their distance from the root cycle. The last example FIG. 4D illustrates a digraph 400D including a directed cycle with an extra node pointing to it. Naturally, the whole cycle is contained within one band, while the extra node is shown in a separate, higher band. In conclusion, explicit drawing of bands may provide useful information regarding the hierarchical relations between nodes and the amount of hierarchy contained in the graph.

Figure 5A:
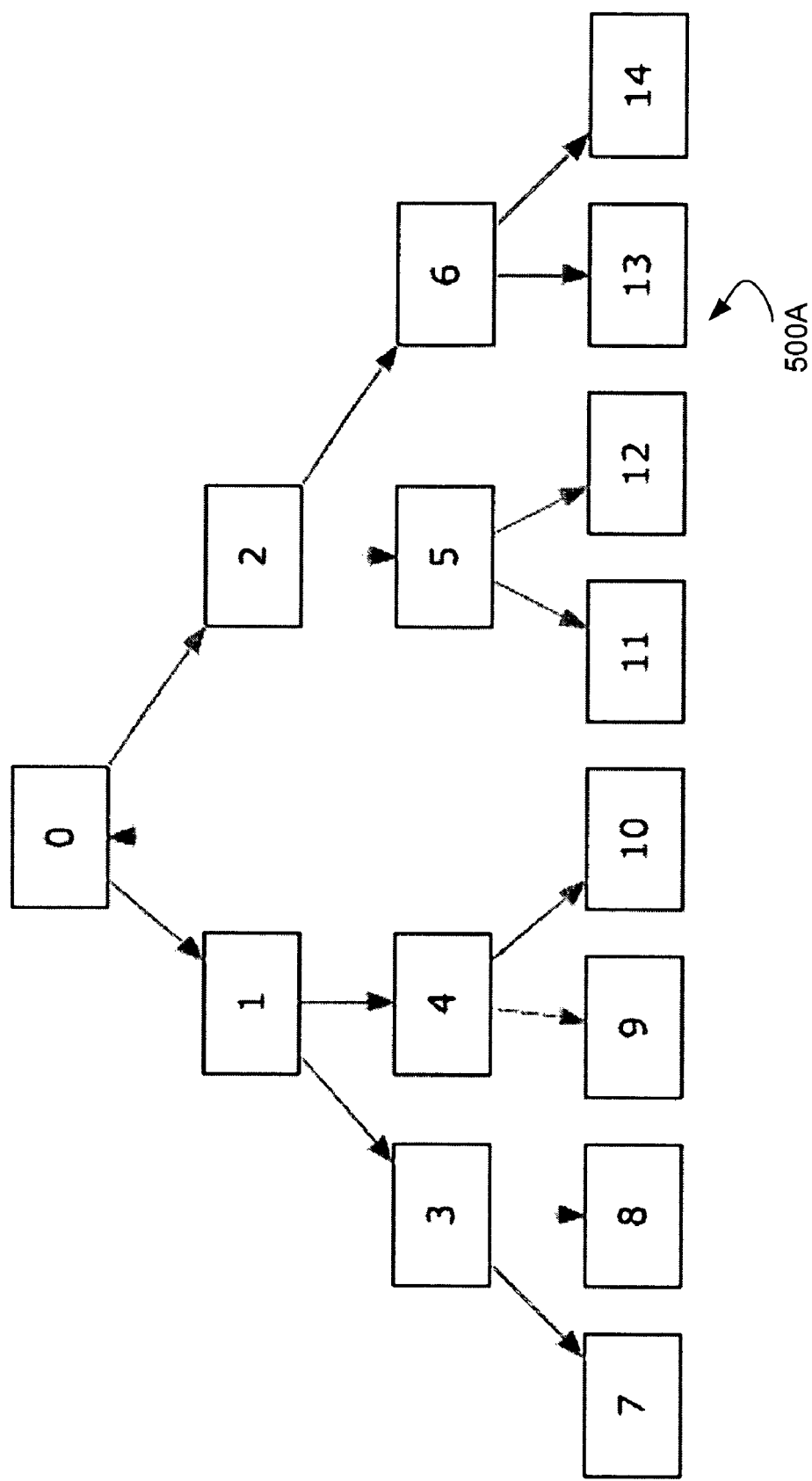
FIGS. 5A and 5B illustrate embodiments of directed graphs constructed by hierarchical and undirected layouts respectively.
Figure 5B:
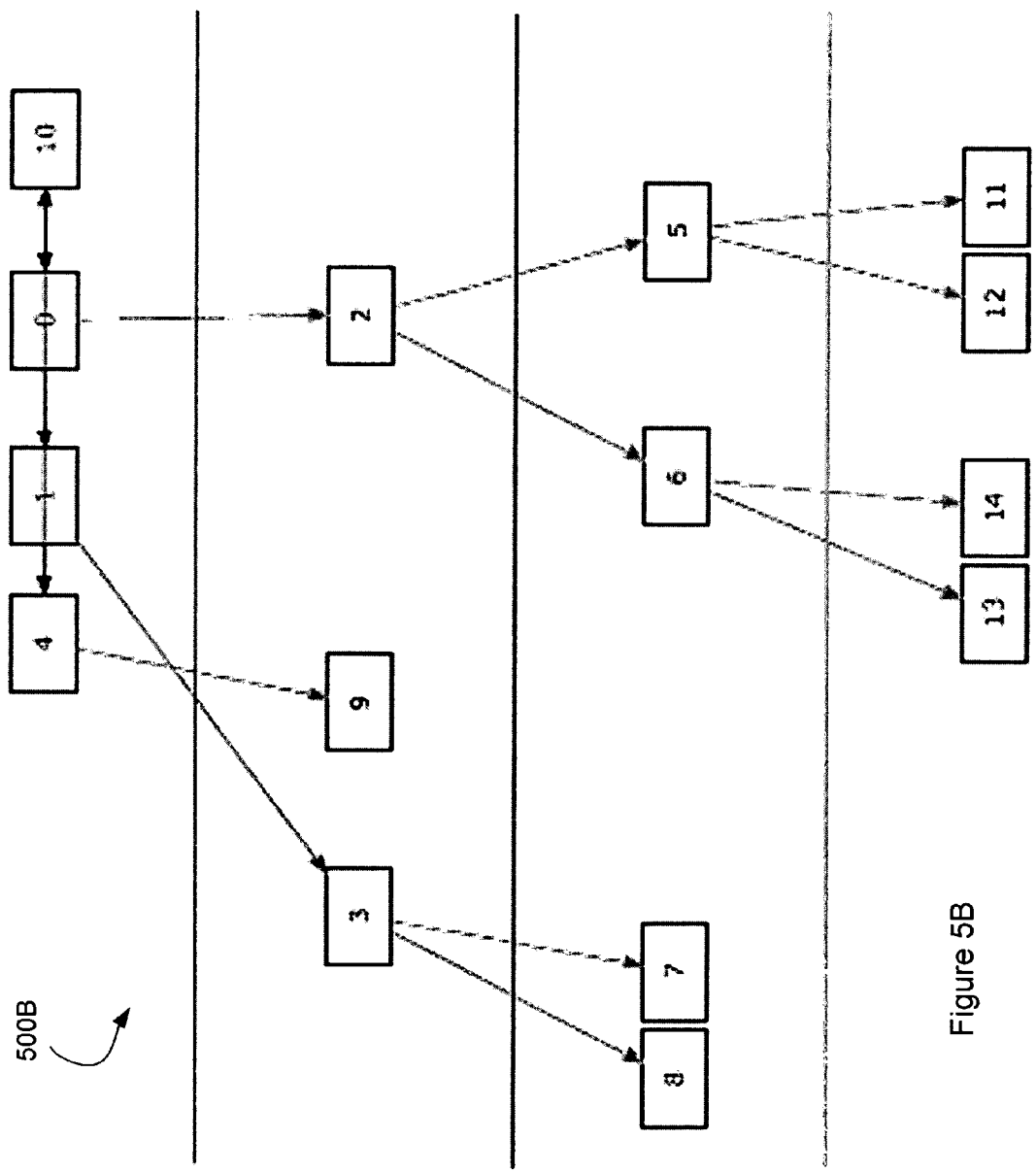
Figure 5C:
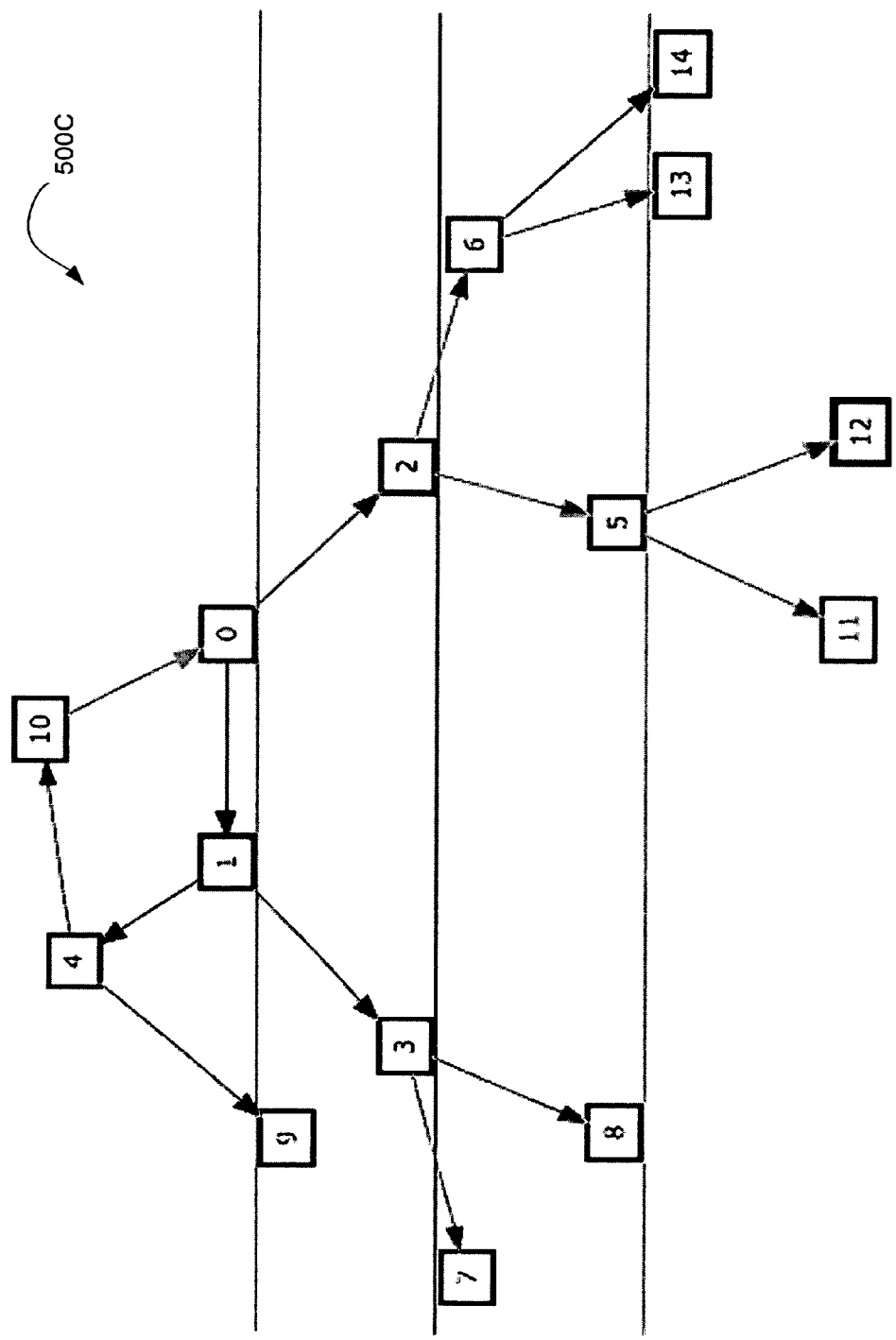
FIG. 5C illustrates an embodiment of a directed graph constructed from DIG-COLA.

The ability of our method to show hierarchy only where it exists, and to produce quality drawings also for non-hierarchical portions of the graph is emphasized in the figures contained herein. For example, this trait is nicely demonstrated in FIG. 5, where three drawings of a digraph containing a directed cycle are shown. The Sugiyama-style layout (FIG. 5A) partitions the digraph into four hierarchical levels with the nodes involved in the cycle spread across all levels. However, based on the connectivity, there is no reason to put any one of the cycle nodes above any other. Therefore, the result of Carmel et al., (FIG. 5B), which assigns y-coordinates directly from hierarchy energy, gives all nodes in the cycle the same y-coordinate. While this is true from the hierarchical standpoint, it is clearly undesirable in terms of readability. Hence, DIG-COLA (FIG. 5C) also places the cycle in a single top band, but adjusts this band so the cycle becomes clear.

Figure 6B:
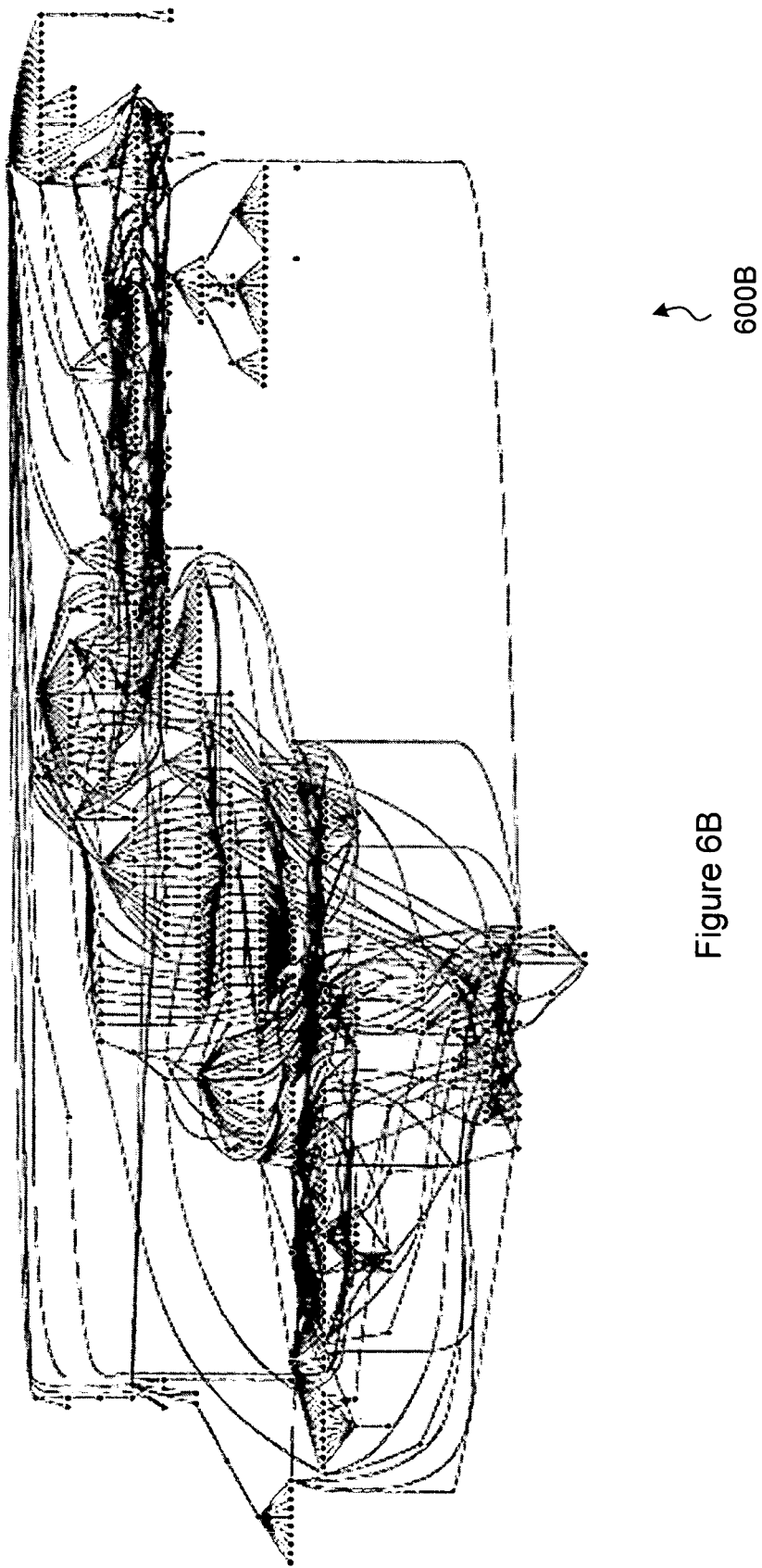
FIG. 6B illustrates an embodiment of a directed graph constructed with a hierarchical layout.

Another visual issue concerns indicating the direction of an edge. The usual convention is by drawing an arrowhead at the end of the drawing contains dense regions the arrowheads become very obscure. Moreover, these arrowheads may occupy precious real estate in the drawing area, thus impairing readability. Luckily, by the nature of the drawing algorithm the vast majority of edges follow a single trend, namely, pointing downwards. Hence, these edges can be drawn without arrowheads, only using arrowheads for those edges that point upwards. An even clearer solution is to use edge coloring when colors are available. Therefore, all edges pointing downwards are colored gray/black, whereas those pointing upward are colored red. If the graph also contains undirected edges, which are permitted by our method, they may be colored blue. For example, consider the graph DG_3692 from a AT&T digraph collection. The layout of the digraph (|V|=559, |E|=1035) is quite dense; see digraph 600A in FIG. 6A. Removing arrowheads for all but the five edges that point upwards (and labeled as and may be colored a specific color for case of appearance) improves readability while presenting the same information. In addition, since by definition the optimization task seeks to preserve edge lengths, it can be assumed with reasonable confidence that the neighbors of any particular node are within a relatively small radius of that node. Hence, in larger graphs, drawing edges is probably less useful than simply drawing the nodes and allowing viewers to assume that proximity implies connectedness. Sugiyama-based methods cannot make this guarantee, as shown in digraph 600B in FIG. 6B. The importance of proximity between connected nodes is discussed later.

Quadratic programming solvers: Many quadratic solvers are available employing a number of different optimization methods. All of them can serve for solving problem (10). One skilled in the art will be aware of such methods. An illustrative list includes, MOSEK, CPLEX, OOQP, BQPD and COPL QP. Experiments were carried out to further demonstrate the methods and systems described using the MOSEK package.

An important characteristic of our special case is that a series of closely related quadratic programs is solved. All programs share exactly the same constraints, while the target function changes slightly between iterations. Hence, computation may be accelerated by initializing each iteration with the solution obtained at the previous iteration. In this way the solver is initialized with a feasible solution (satisfying all constraints) that is close to the optimal solution.

However, it appears that such initialization, called "warm-start" is not trivial for the barrier (or interior-point) methods used by most commercial solvers. One family of methods that facilitate warm start is the so-called "active-set" approach. Also, it should be possible to further improve the performance of an active-set method based on insight into the specific type of constraints used (for example, in our case each constraint involves only two variables). Known algorithms may seem very fast indeed, although they may only deal with single-variable constraints.

The fact that the matrix $L^w$ is positive semi-definite is because of the convexity of the quadratic program. This means that every $x \in \mathbb{R}^n$ satisfies $x^T L^w x \geq 0$. This inequality can be validated by using the fact that for all $i \neq j$, $w_{ij} > 0$ and noting that $x^T L^w x = \sum_{i<j} w_{ij}(x_i - x_j)^2 \geq 0$. Consequently, the quadratic form has only global minima. However, many solvers prefer dealing with strict positive definite matrices, ensuring the uniqueness of the global minimum. $L^w$ can be easily transformed into a positive definite matrix without affecting the majorization process. Observe that problem (10) has a translation degree of freedom, which is the source multiple minima. Hence, node 1 may be fixed at the origin without loss of generality, i.e. set $X_1 = (0, 0, \ldots, 0)$. In the constraints all occurrences of $X_1$ should be replaced with zeros. Moreover, we can safely remove the first row and column of $L^w$ without affecting the value of the function. It can be shown that the resulting matrix is positive definite, and now we always have a unique global minimum, thus eliminating all degrees of freedom.

Reducing the quadratic program: Note that the constraints involve only the y-axis, $X^{(1)}$ and that the target function is a sum of terms, each of which includes only a single axis. Thus, problem (10) may be safely decomposed into two problems, one constrained and one unconstrained. The first problem yields $X(t+1)^{(1)}$ $$\min_{X^{(1)}} (X^{(1)})^T L^w X^{(1)} - 2(X^{(1)})^T L^{X(1)} X(t)^{(1)} \qquad (11)$$

$$\text{subject to: } \forall \, j \in \mathscr{L}_i : X_j^{(1)} \geq l_i, \quad i = 1, \ldots, k-1$$

$$\forall \, j \in \mathscr{L}_{i+1} : X_j^{(1)} + G \leq l_i, \quad i = 1, \ldots, k-1.$$

And the second problem yields the rest axes $X^{(2)}, \ldots, X^{(d)}$ $$\min_{X} \sum_{a=2}^{d} \left( (X^{(a)})^T L^w X^{(a)} - 2(X^{(a)})^T L^{X(t)} X(t)^{(a)} \right). \qquad (12)$$

Solving problems (11), (12) will reproduce the solution of the original problem (10). However, solving two separate problems is much more efficient. The constrained problem (11) involves much fewer variables than the original (10) and hence is faster to solve. Regarding the unconstrained problem (12), its solution takes a relatively negligible time and is given by solving the equation systems $L^w X^{(a)} = L^Z Z^{(a)}$, $a=2, \ldots, d$.

Figure 7B:
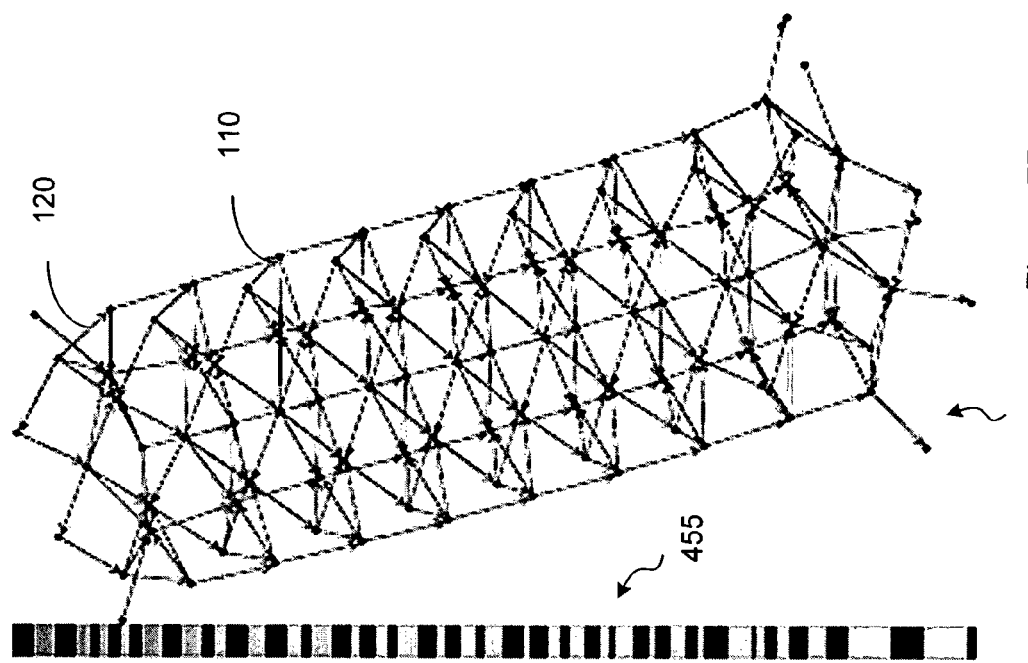
FIGS. 7A and 7B illustrate embodiments of related directed graphs constructed by DIG-COLA with varied characteristics.
Figure 7A:
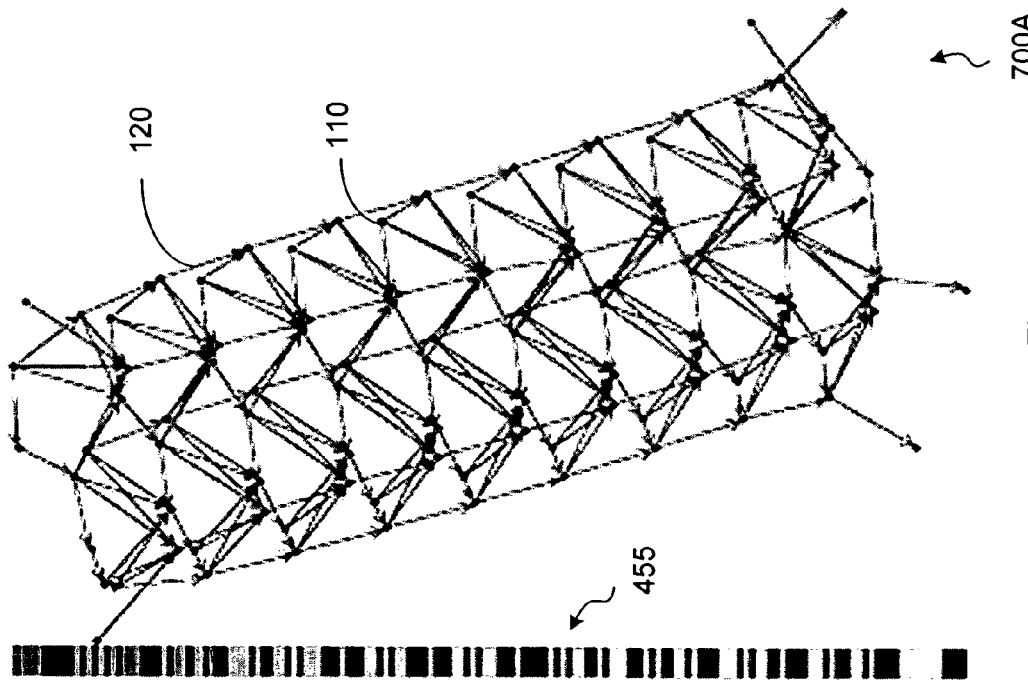
Figure 8A:
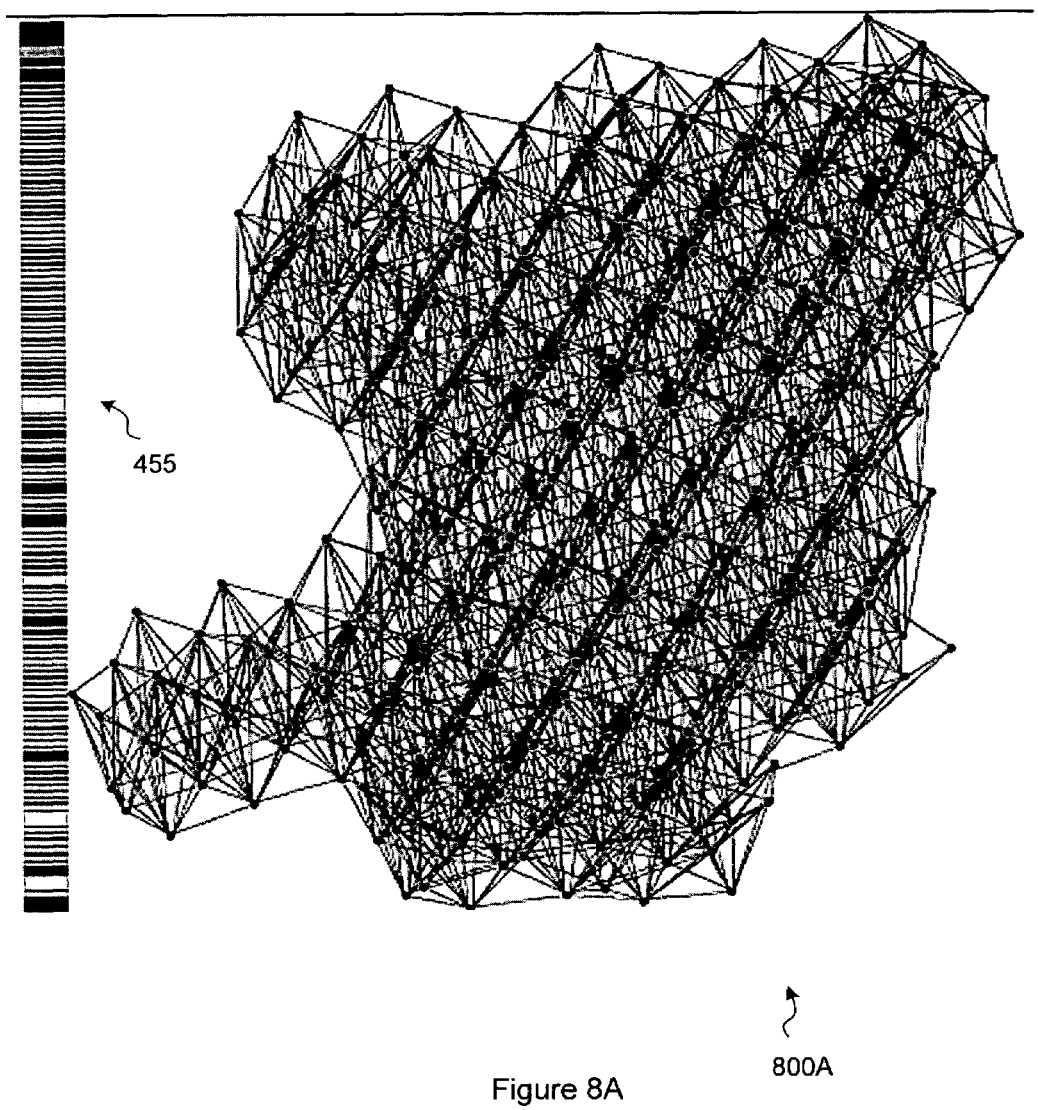
FIGS. 8A and 8B illustrate embodiments of related directed graphs constructed by DIG-COLA with varied characteristics.
Figure 8B:
Figure 8B:
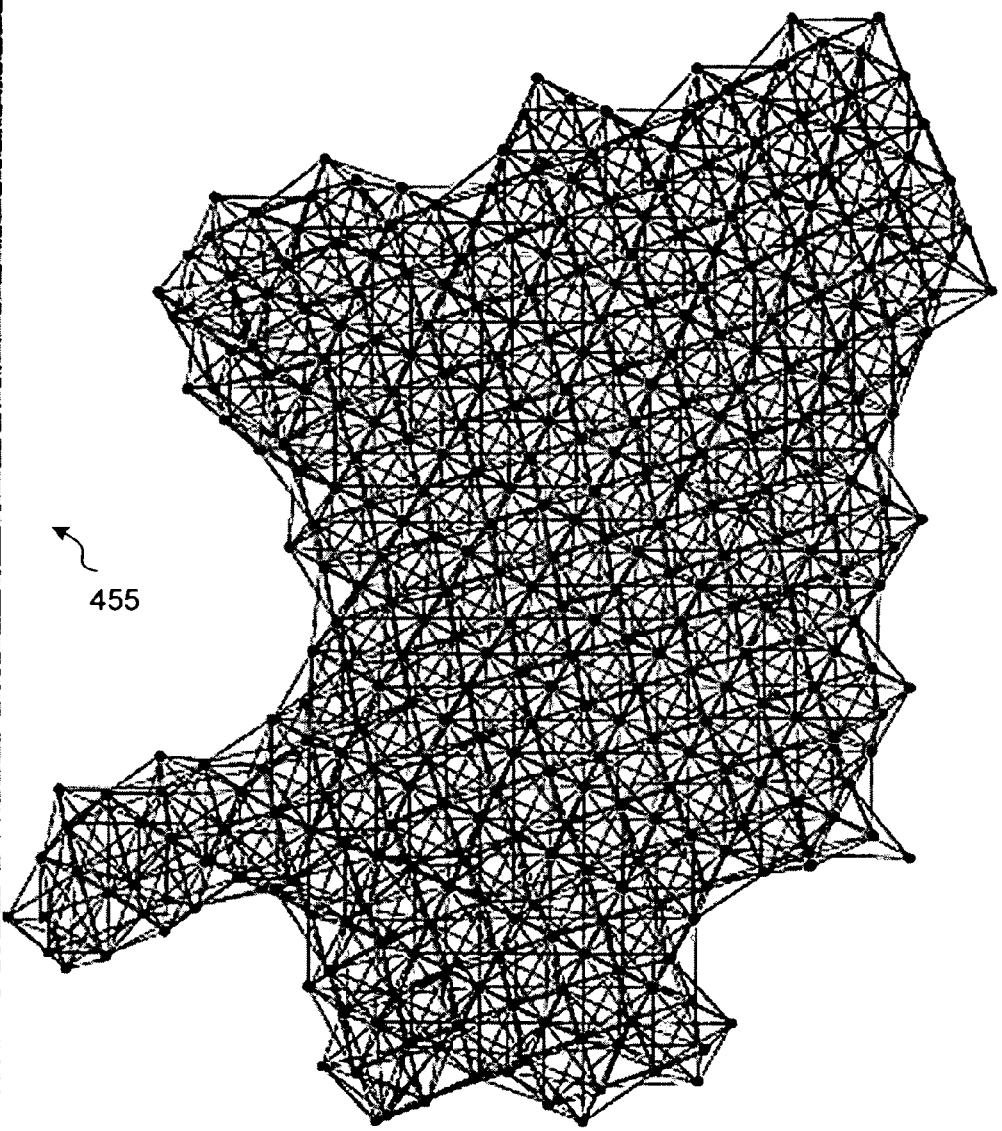

When negative is a plus: Interestingly, one can set a negative value for G (the minimum gap between levels). This permits slightly breaking the constraints by a quantity limited by |G|. Put differently, a negative G allows a limited "local" deviation of nodes from their designated bands. To make sure that these deviations are local and cannot change the global nature of the layout, we add the constraint: $l_1 \leq l_2 \leq \ldots \leq l_{k-1}$. It has been observed that allowing small deviation sometimes gives us the necessary freedom for overcoming local inefficiencies in the layout, without affecting visualization of the overall directionality. This is a unique feature of our method that becomes possible by the clear separation between constraints and cost function. Here, two examples where negative gap was advantageous we described. The graphs 700A and 700B, Nos 4, in FIGS. 7A and 7B respectively, is based on a finite element approximation to a beam structure. Here, setting G=−1 improves layout quality while still being very similar to the layout that was achieved with G=0. The second set of graphs 800A and 800B, Plat362, in FIGS. 8A and 8B, is based on a finite-difference model for the shallow wave equations for the Atlantic ocean. Here, G=−2 was found to provide better quality, while overall hierarchy depiction is not significantly affected.

Figure 9A:
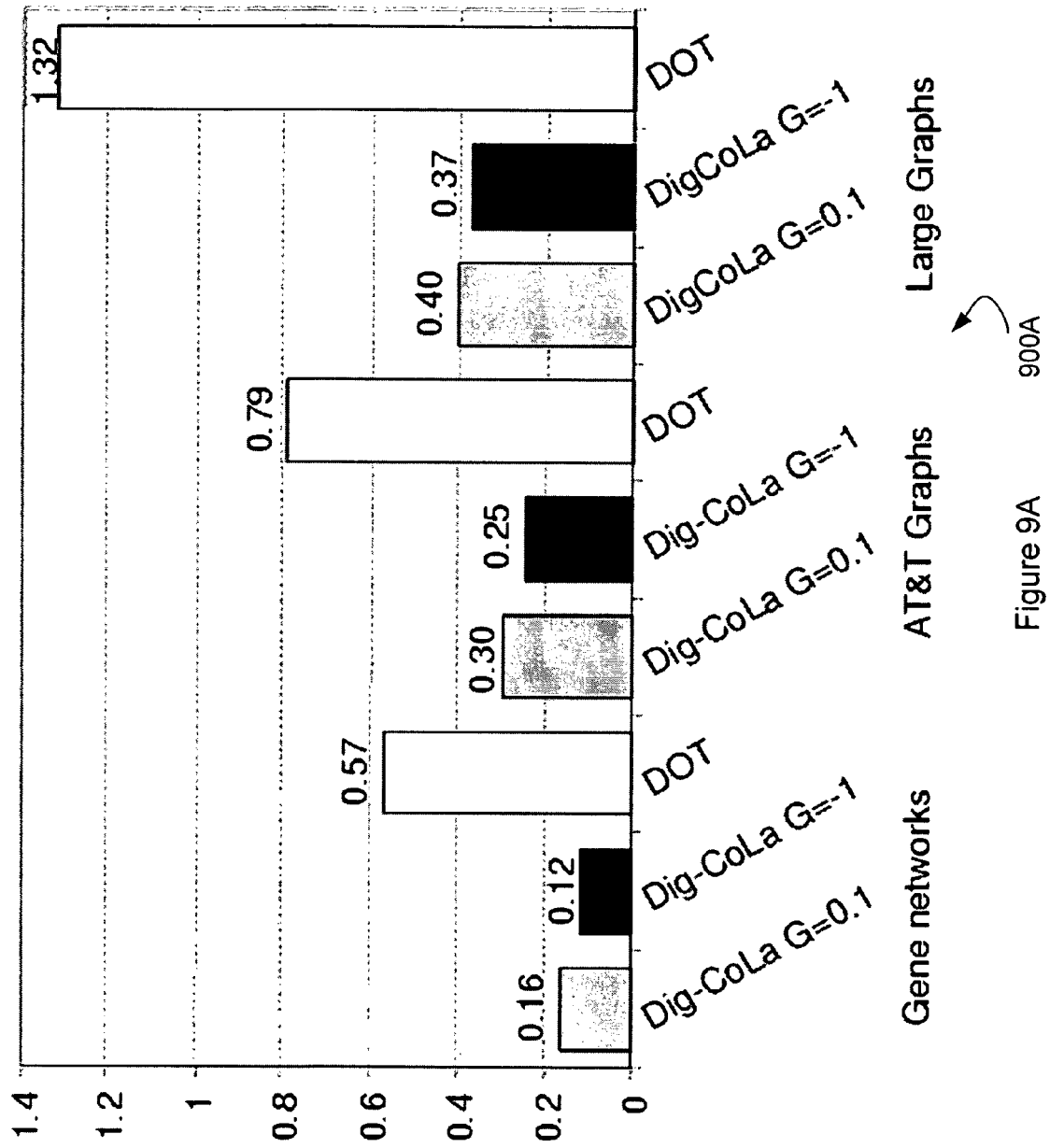
FIGS. 9A and 9B illustrate experimental results from constructing directed graphs by DIG-COLA.
Figure 9B:
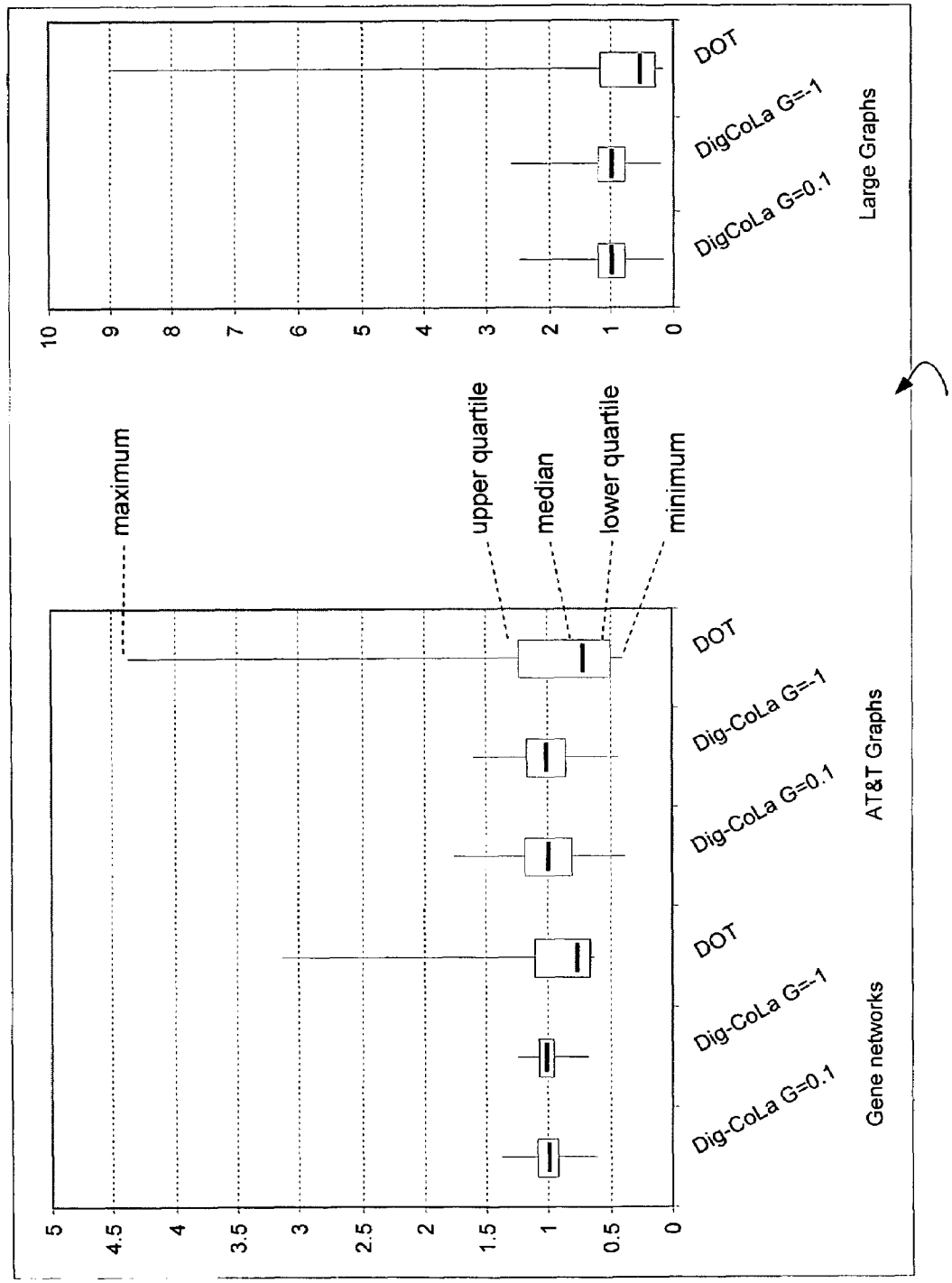
Figure 10:
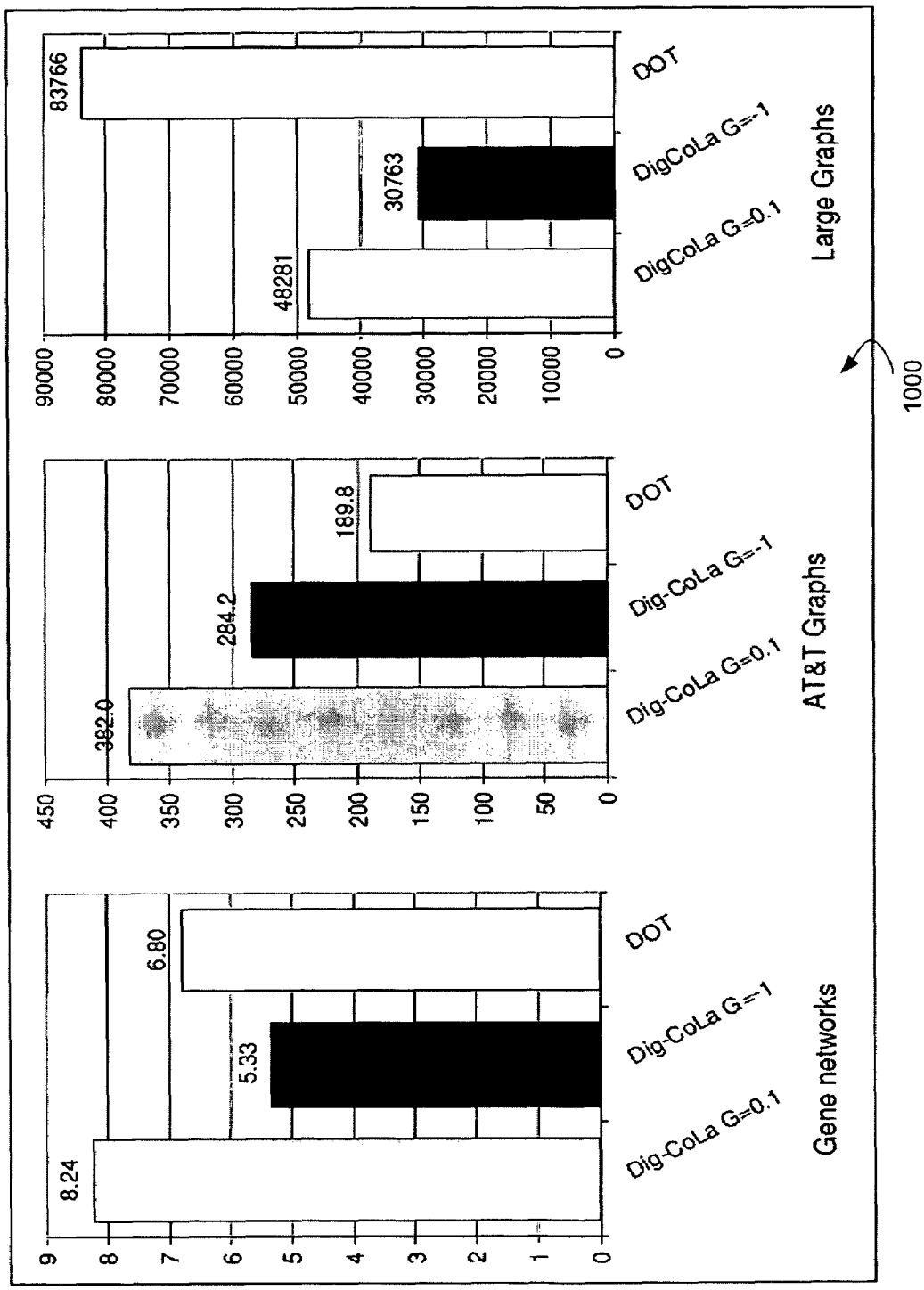
FIG. 10 illustrates experimental results from constructing directed graphs by DIG-COLA.

Demonstrative Illustrative Experiments: Previously it was described that the DIG-COLA method is more suitable for larger digraphs than the known Sugiyama-style layout. Sugiyama style layout includes an edge crossing minimization heuristic not found in DIG-COLA. This may indicate that there is some trade off between edge crossing reduction and consistent edge length. To see how these methods perform in practice and for explanation and clarity of the methods/systems described herein, an experimental study has been completed on a large collection of graphs from various application domains, comparing the performance of both the DIG-COLA and Sugiyama methods. Below the results of this study are presented. The three datasets used in the following quantitative analysis were compiled from different repositories with the aim of capturing a variety of graph types and application domains. The first class of graphs is a set of 258 gene-activation networks. The graphs are of varying sizes (up to |V|=95, |E|=110), generally quite sparse (|E|≤2|N|) and frequently contain directed cycles. The second set comes from specific AT&T Graphs. This latter repository contains over 5000 directed graphs. Of these, we extracted the largest connected component from each graph and filtered out very large and very small graphs (leaving 2464 graphs of 10≤|V|≤200). Using random selection, this number is further reduced to a more manageable sample of 100 graphs. A third set of 34 graphs is obtained with 200≤|V|≤1919 from the larger graphs of the AT&T collection and known sources. Our test systems were our own implementation of the DIG-COLA algorithm and the freely available program DOT: an implementation of a Sugiyama-style layout distributed as part of GRAPHVIZ These programs were run against each of the graphs in our test data sets and running time, edge lengths and count of crossings were recorded. DIG-COLA was run with G=0.1 and G =−1. edge lengths l for each graph layout. That is, l=L/¯L where L is raw edge lengths for each layout and ¯L is the average value of L. Thus, for each graph layout ¯l/=1. The results concerning l are summarized graphically in graphs 900A and 900B in FIGS. 9A and 9B. With both layout styles the average sample standard deviation σ̄ was smaller for the sparser gene activation networks than the AT&T graphs, however for all data sets the DOT layout σ̄ was at least double that of the DIG-COLA layouts, as shown in FIG. 9(a). From the box plots 900B in FIG. 9B, it may be observed that, while the edge-length distribution is narrow and even for DIG-COLA layouts, DOT layouts give a large difference between the upper quartile and maximum edge lengths. That is, DOT layouts tend to have a small number of very long edges. Note that, as per speculation described elsewhere in, setting a negative value for G gave a further decrease in edge-length variance at the expense of more upward pointing edges. Note also, that edge lengths reported for DOT output are a conservative estimate based on Euclidean distance between start and end node positions (i.e. bends are not considered). Regarding edge crossings, the expected trade-off described above was observed for the smaller graphs. That is, DIG-COLA tended to produce more crossings, particularly in the denser AT&T Graphs (see graph 1000B in FIG. 10B). Again, however, it may be argued that in dense graphs, drawing the edges is less important than maintaining relative proximity of nodes. Note that in the sparser gene networks DigCoLa with G=0.1 gave an increase in crossings over DOT, while setting G=−1 gave fewer crossings than DOT (see graph 1000A in FIG. 10A). For the set of the larger graphs DOT also gave more crossings than DIGCOLA.

Figure 11A:
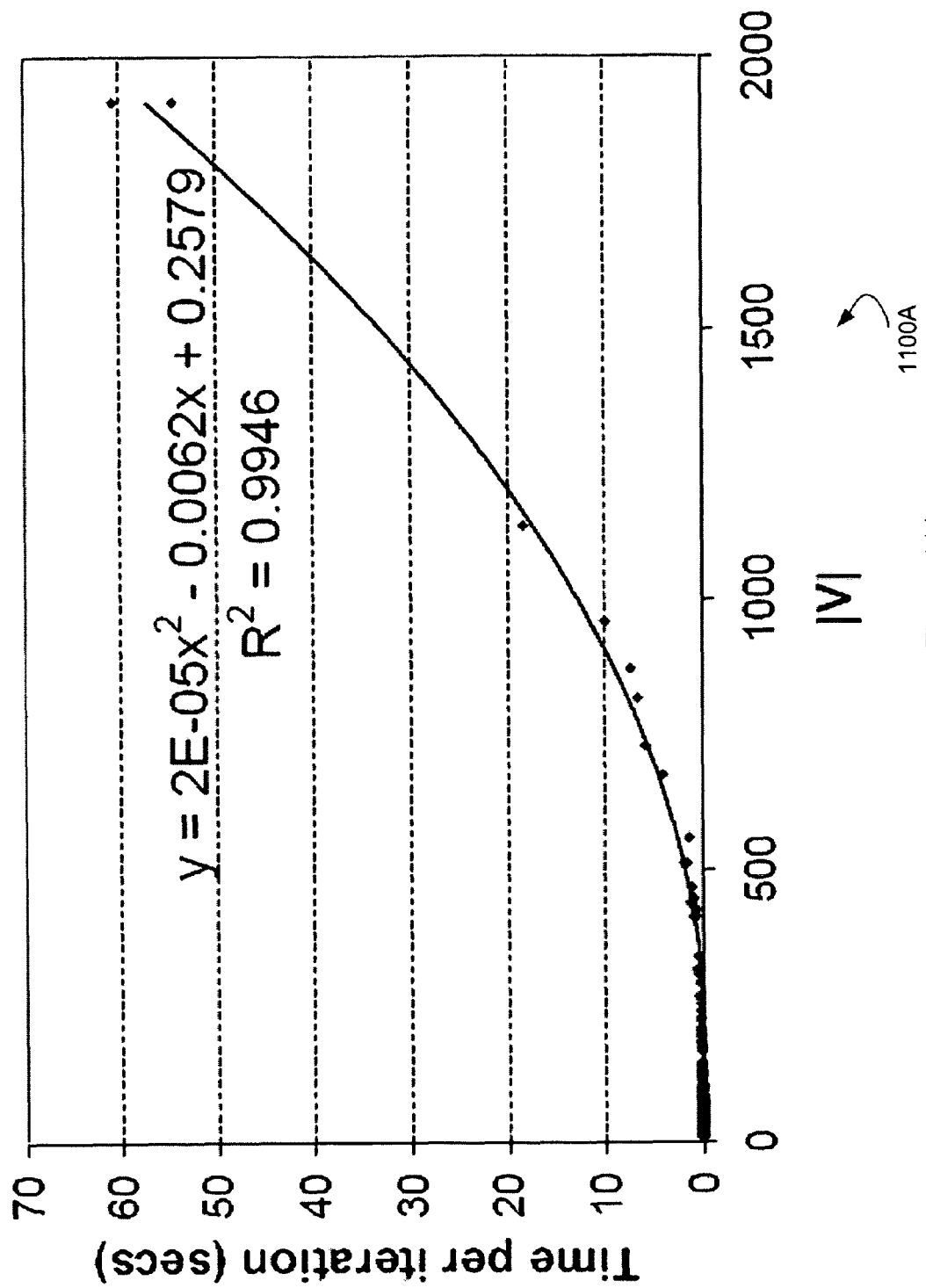
FIGS. 11A, 11B, and 11C illustrate experimental results of exemplary performance testing of DIG-COLA.
Figure 11B:
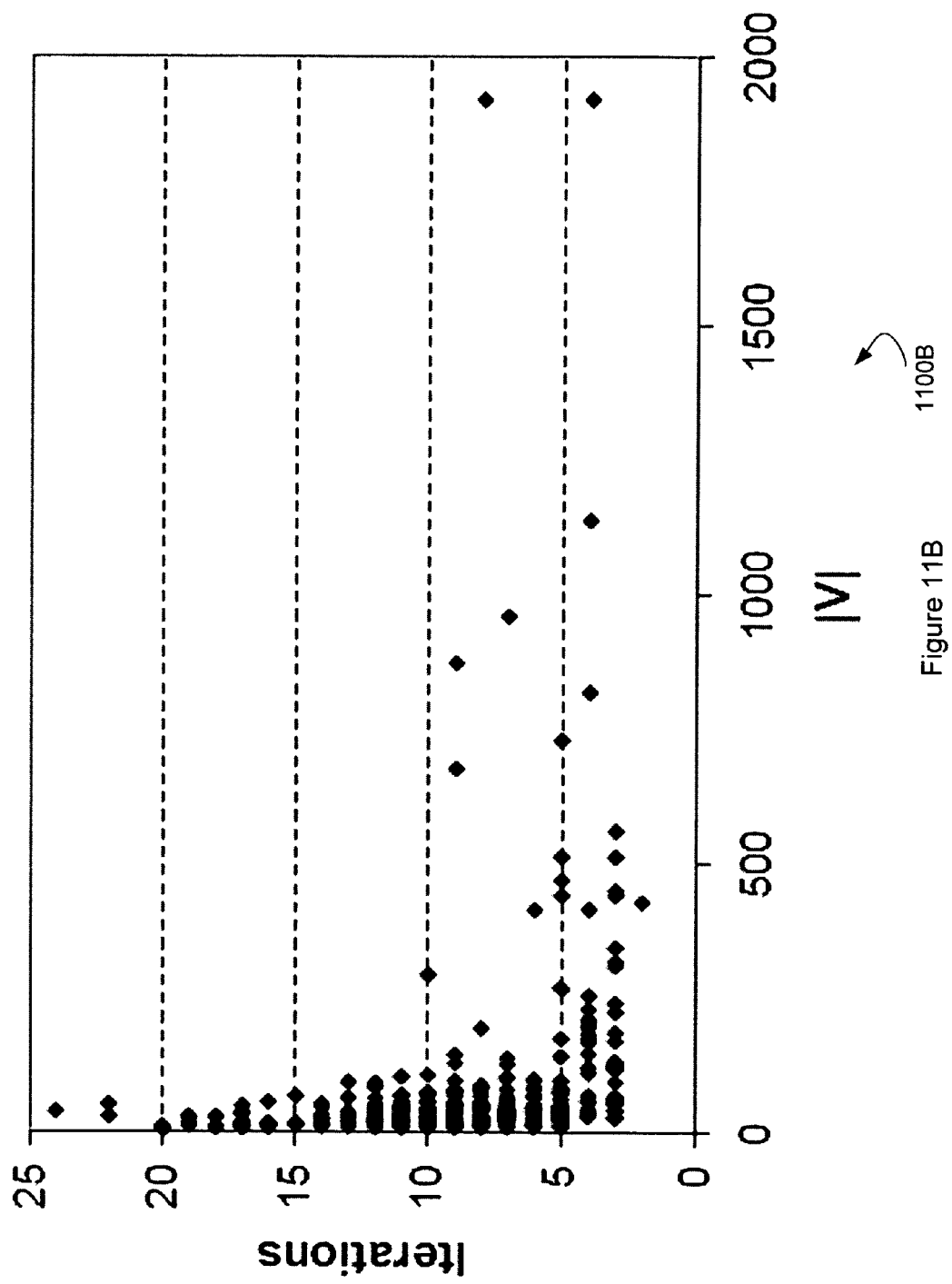
Figure 11C:
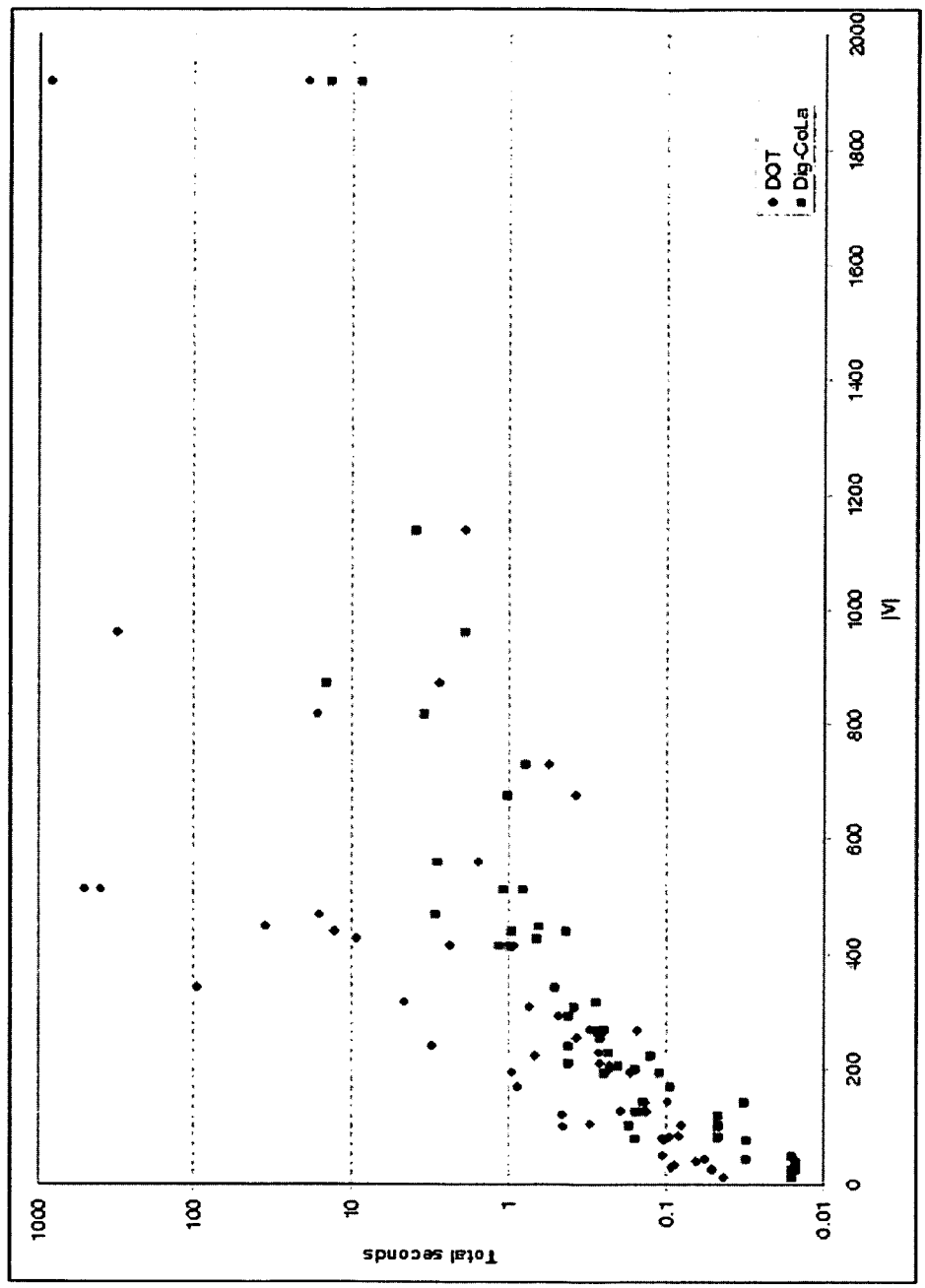

Finally, a note on running time of DIG-COLA. All tests were run on a 2 GHz PENTIUM M machine. The results are shown in the graphs 1100A, 1100B, and 1100C in FIGS. 11A-C. Time per iteration (FIG. 11A) clearly increases polynomially with number of vertices and must be at least $O(n^2)$ per iteration since we are dealing with the dense n×n matrix $L^w$. However, the number of iterations required to satisfy $\Delta stress < \epsilon = 0.01$ (FIG. 11B) is more difficult to predict. In the described tests, graphs with |V|<100 were arranged in under a second; those with |V|<600 took less than 10 seconds and a matrix market graph (plat1919) with |V|=1919 took 7 minutes. On average 98% of the running time is spent inside the Mosek quadratic program solver. It is expected that an active-set method, modified as discussed previously, would decrease running times for the larger graphs enough to allow for use in interactive applications.

Figure 12:
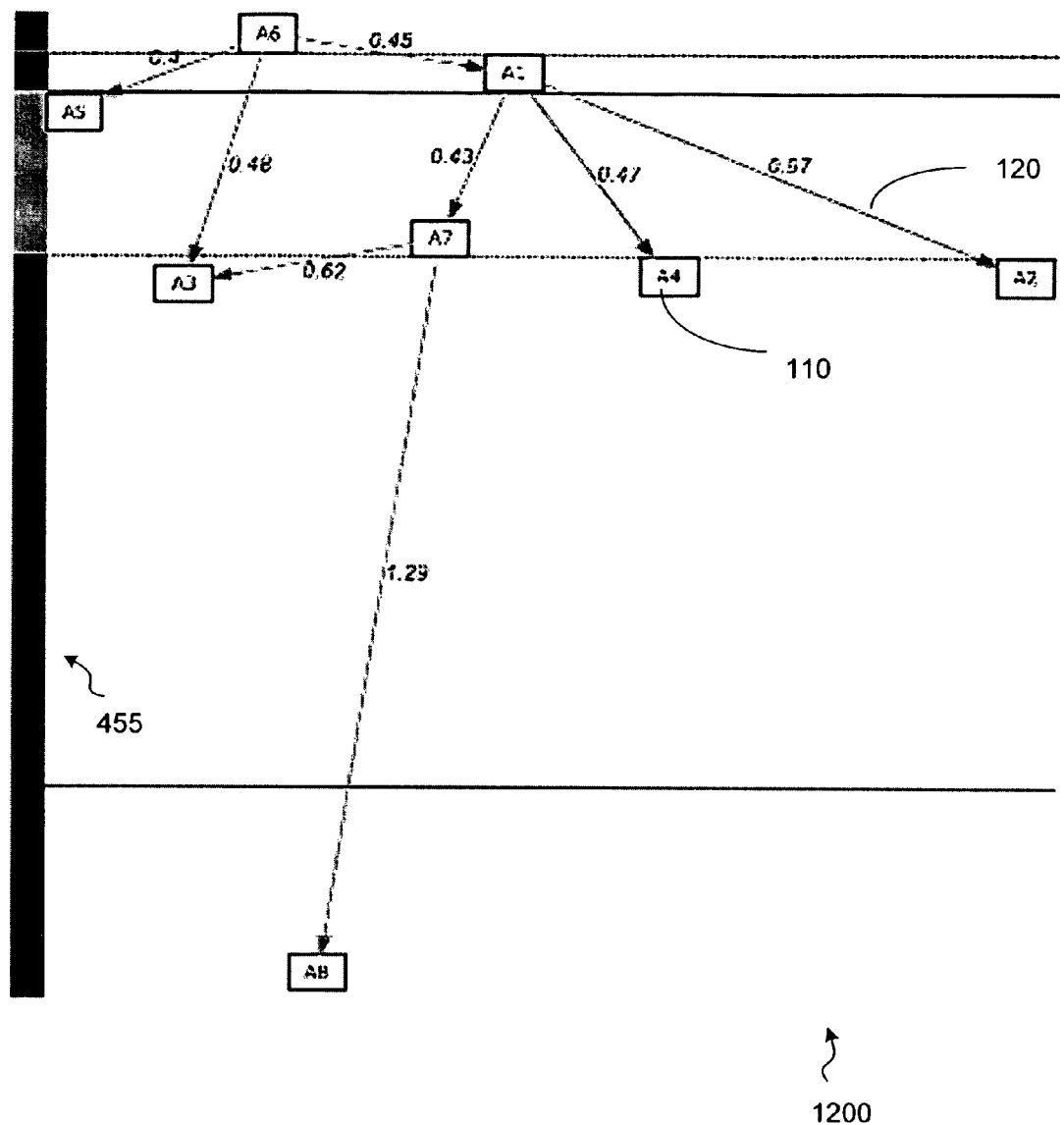
FIG. 12 illustrates an embodiment of a directed graph constructed by DIG-COLA.

Variable Edge Length, Other Partitionings and directional MDS: The capability for conservation of default edge length that has been demonstrated herein, can be very useful in applications where relative edge weights need to be studied. For example, Bayesian networks are directed acyclic graphs where nodes represent variables and edges represent causality relationships between pairs of variables. The edges can be weighted to indicate the strength of these relationships. Typically Bayesian networks are visualized using Sugiyama style layout. In graph 1200 in FIG. 12, for example, a small example of a Bayesian network drawn with DIG-COLA such that edge lengths correspond to the inverse of these weights is provided. That is, the shorter the edge between a pair of nodes, the stronger the causality relationship between the corresponding variables. Based on the results of a quantitative analysis it can be observed that such a close correlation between edge weight and length would be very difficult to achieve with a Sugiyama layout.

Figure 13:
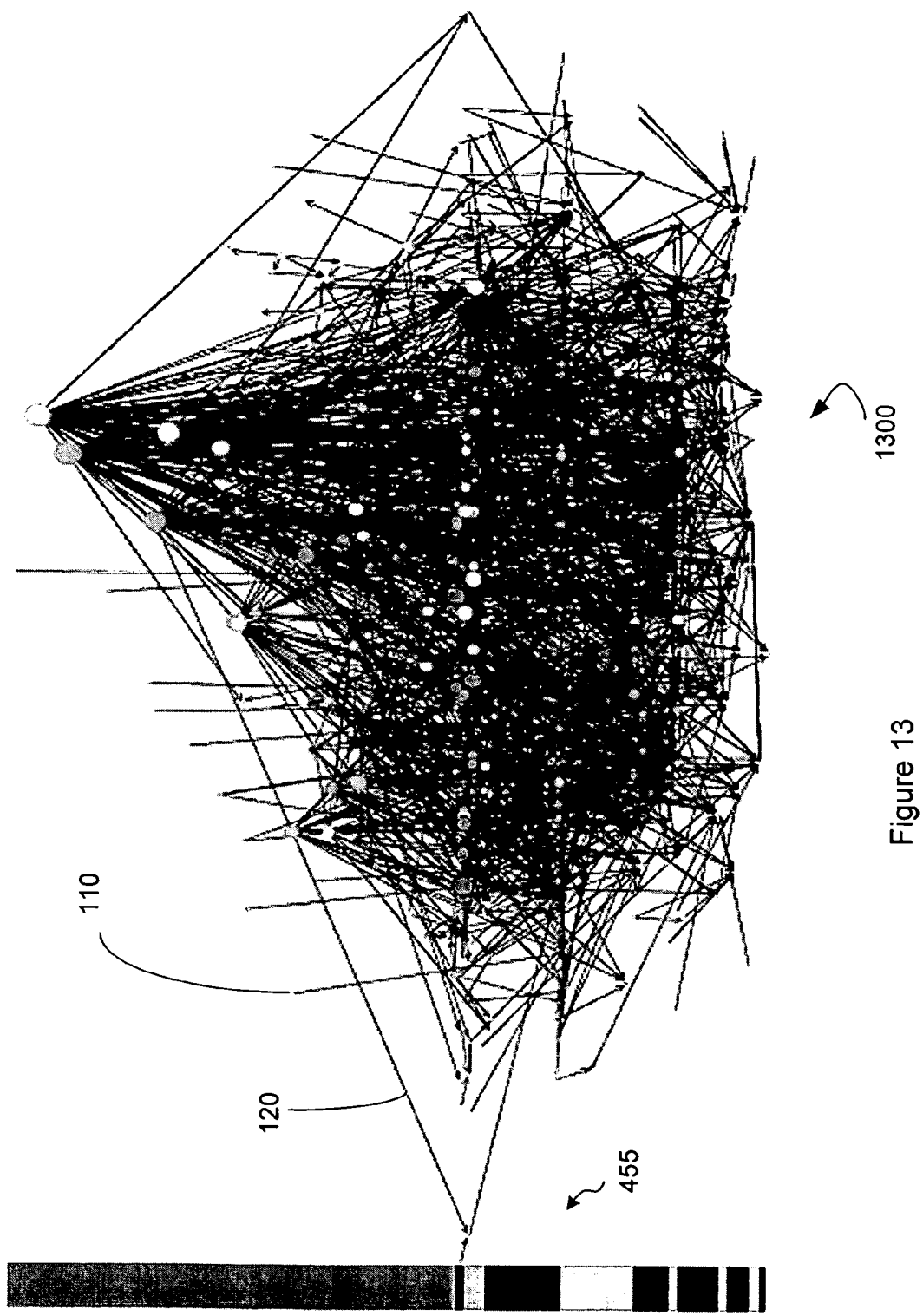
FIG. 13 illustrates an embodiment of a directed graph constructed by DIG-COLA.

Generating hierarchy constraints based on the hierarchical structure of a digraph has been discussed, but the constraints could just as easily be based on another, domain specific, parameter. For example, graph 1300 in FIG. 13 shows an evolving graph with hierarchy bands corresponding to different time periods. In this case the graph is the citation network featured in the Infovis 2004 Competition. Nodes represent papers and they are constrained in the y-dimension to lie in bands corresponding to year of publication. Other methods for visualizing such evolving graphs (e.g. FIG. 1A) require fixing nodes in one dimension, which leaves less freedom to satisfy desired edge lengths.

The fact that the general stress majorization method described herein has its roots in the field of multidimensional scaling (MDS) leading us to believe that some MDS applications could a Iso utilize the type of hierarchy constraints used in DIG-COLA. In general graph visualization and MDS are closely related. MDS may be thought of as the visualization of the weighted, complete graph defined by the dissimilarity matrix of a set of high-dimensional data. The DIG-COLA method can be applied to such a complete graph to perform MDS and we can map an additional data dimension to hierarchy constraints. This can be called Directional MDS, or DMDS. For example, given high-dimensional time-series data we can produce an MDS plot separating the points corresponding to various time periods into different bands (as we did for the evolving graph).

Figure 14:
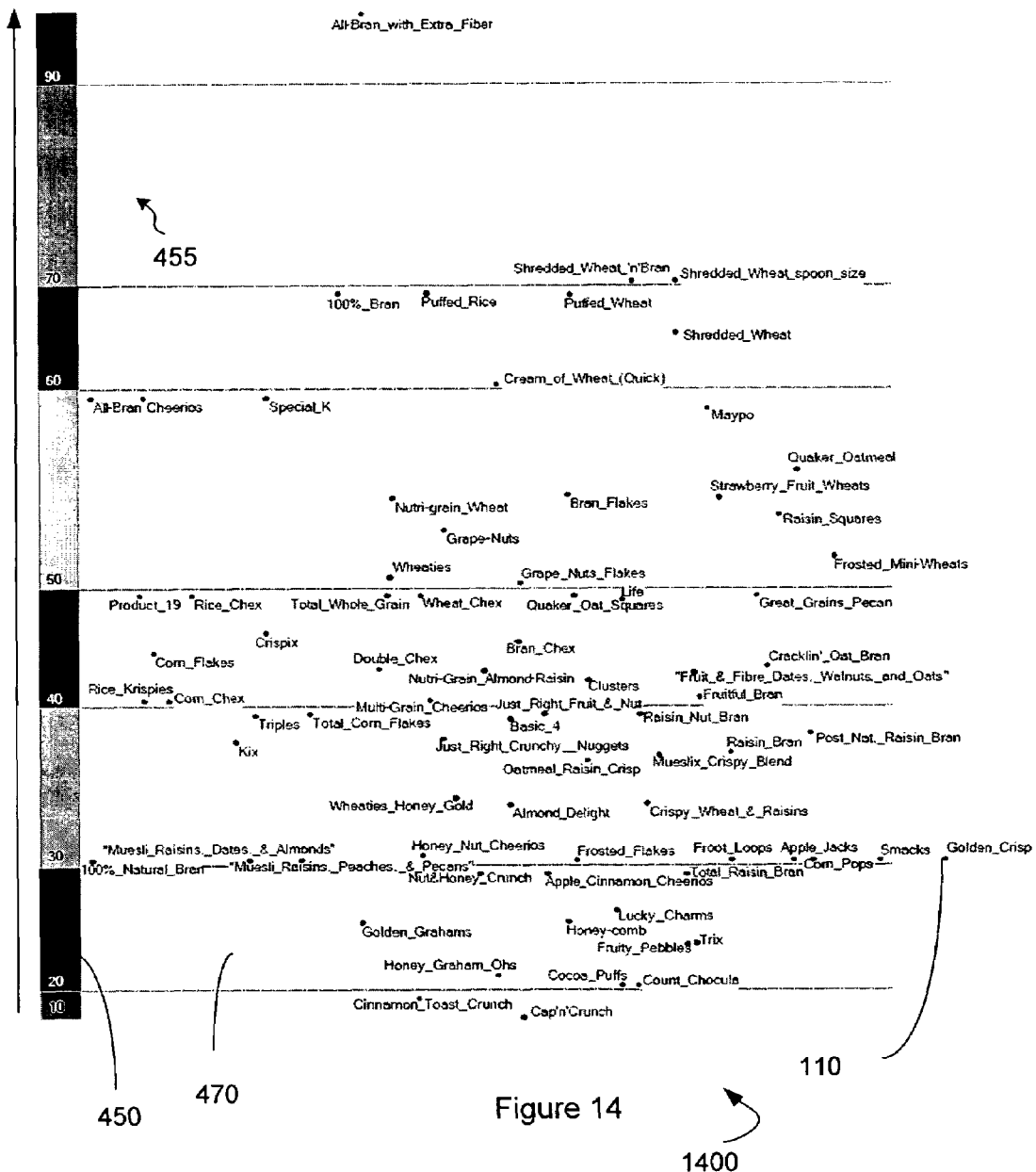
FIGS. 14, 15, and 16 illustrate embodiments of directed graphs constructed with DIG-COLA.

A practical example of DMDS is shown in graph 1400 in FIG. 14. Here, a multivariate data set of nutritional information for popular breakfast cereals has been used to construct a dissimilarity matrix. Eight variables (fibre, starch, sodium etc.) were used. Hence, a traditional MDS algorithm would produce a 2D map of the cereals so that their relative positions correspond to their nutritional similarity. Using DMDS a 9th variable of the dataset, a dietitian's "health rating" of each cereal may be clearly shown. By partitioning the cereals based on this health rating we introduce hierarchy to the layout such that the healthiest cereals appear at the top and the least healthy are constrained to the bottom. The result achieves two goals. Not only do we show similarities between the cereals based on their nutritional value, but we also allow easy recognition of the relative health rating of the cereals. Note that high-fibre cereals are generally to the top left of the figure and a cluster of starchier rice- and wheat-based cereals is visible on the upper right.

Figure 15:
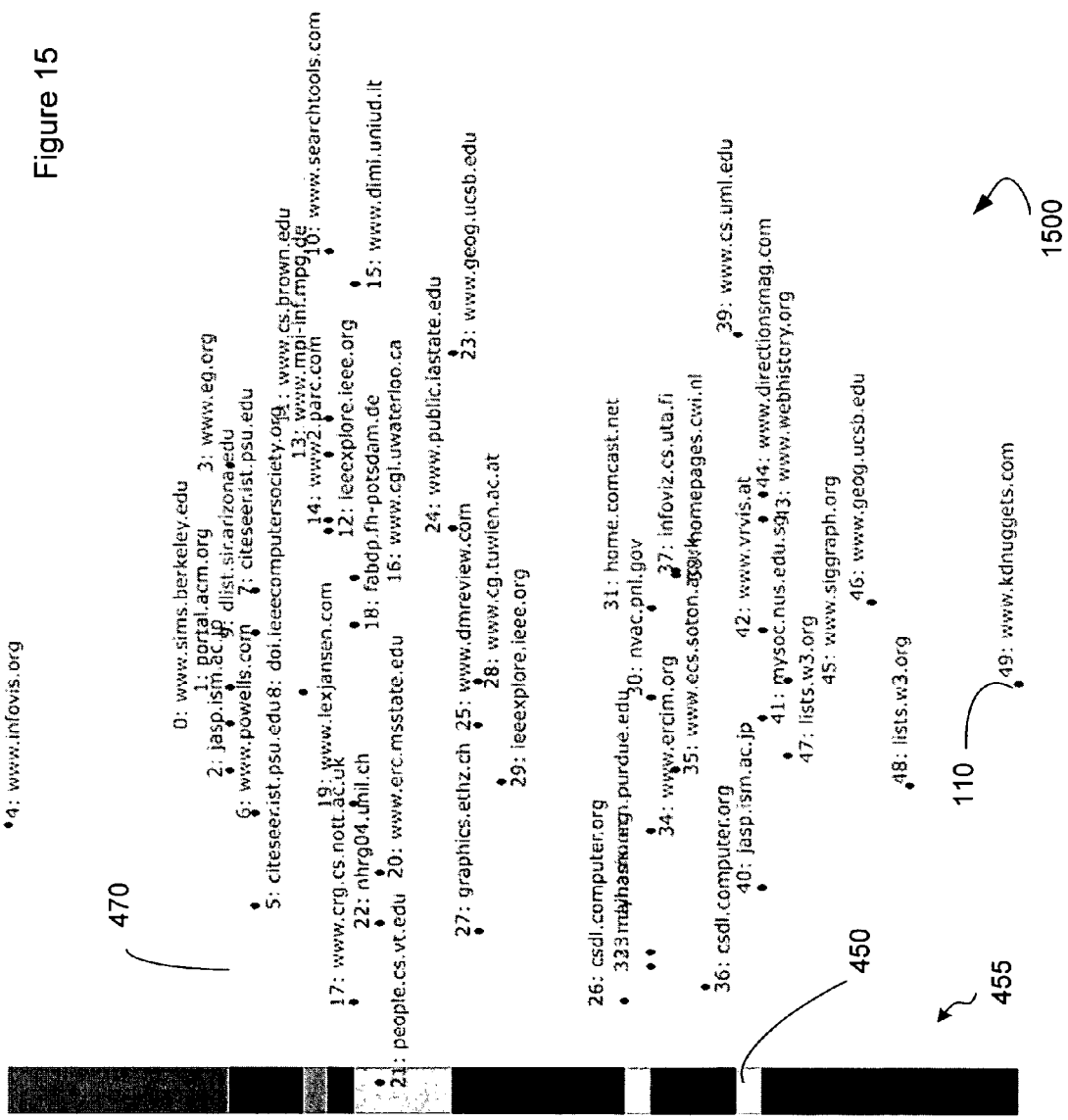
Figure 16:

Further capabilities are also available depending on specific desired characteristics. For example, someone would like to visualize the top 50 resulted items received when searching on the well known search engine www.google.com using the search term "multidimensional information visualization." Graphs 1500 and 1600, appearing in FIGS. 15 and 16 respectively, illustrate the displaying of the resultants of the described "googling." The main distinction is a modification of the constraints or parameters applied. Graph 1600 is constrained such that each of the bands 470 is the same height. Graph 1500 was not constrained in such a manner. These two graphs 1500 and 1600 illustrate a manner in which characteristic constraints available using the described methods and systems.

Force-directed placement (FDP) is considered most popular approach to drawing undirected graphs. However, FDP is not typically employed for drawing digraphs. An important contribution of this work is in reducing this distinction between undirected and directed graph drawing methods. For the first time, it is shown herein that the same stress function can also serve for hierarchical drawing of a digraph. Moreover, the same majorization optimization method can still be used, without affecting its convergence properties. As a consequence, the virtues of FDP that made it very popular for drawing undirected graphs, may now be in a well-behaved force-directed method for drawing directed graphs via DIG-COLA. These virtues include an ability to preserve proximity relations (as reflected by conservation of default edge length), clear decomposition to clusters when they naturally exist (especially when using linear-network distance, reliable display of graph symmetries and a natural capability to handle multidimensional layouts.

As described and shown by illustration in FIG. 3, one or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A system comprising:
   one or more processors; and
   one or more memories storing computer-readable instructions that, when executed by the one or more processors, cause the one or more processors to perform a method of:
      receiving data associated with nodes for graphically displaying the nodes;
      assigning hierarchical levels to the nodes based on the data associated with the nodes;
      clustering the nodes according to the hierarchical levels to assign the nodes to bands, at least one of the bands corresponding to a range of coordinates;
      performing a constrained stress minimization on the data, wherein the constrained stress minimization is subject to hierarchical constraints based on the bands and computes x-coordinates and y-coordinates of the nodes; and
      outputting results of the constrained stress minimization on a visual medium,
      whereby symmetric nodes within a cycle that are assigned to the at least one of the bands are outputted on the visual medium with one of x-coordinates and y-coordinates of the symmetric nodes all being within the range of coordinates of the at least one of the bands and including different coordinate values.

2. The system of claim 1, wherein performing a constrained stress minimization includes selecting a series of quadratic functions and bounding a stress function with the series of quadratic functions.

3. The system of claim 2, wherein performing a constrained stress minimization further includes iteratively minimizing linearly constrained quadratic functions.

4. The system of claim 3, wherein each iteration of the iteratively minimizing linearly constrained quadratic functions decreases stress.

5. The system of claim 2, the method further comprising fixing a node.

6. The system of claim 1, wherein outputting results of the constrained stress minimization on a visual medium includes displaying a digraph having a plurality of edges, each of the edges colored according to a primary direction of orientation of the edge.

7. The system of claim 1, wherein the performing a constrained stress minimization on the data includes performing a minimization of a stress function with a quadratic solver, the quadratic solver being one of MOSEK, CPLEX, OOQP, BQPD, and COPL_QP.

8. The system of claim 1, wherein the hierarchical constraints include a hierarchy constraint that constrains one of an x-coordinate and a y-coordinate of each of the nodes to be less than a range of coordinates of a preceding band and to be greater than a range of coordinates of a subsequent band.

9. The system of claim 1, wherein the hierarchical constraints include a gap constraint that defines a gap between ranges of coordinates of consecutive bands, one of the y-coordinates and the x-coordinates of the nodes being outside of the gap.

10. A method for graphically displaying nodes on a display device, the method comprising;
    receiving data associated with the nodes;
    assigning, with a processor, hierarchical levels to the nodes based on the data associated with the nodes;
    clustering, with the processor, the nodes according to the hierarchical levels to assign the nodes to bands, at least one of the bands corresponding to a range of coordinates;
    performing, with the processor, a constrained stress minimization on the data, wherein the constrained stress minimization is subject to hierarchical constraints based on the bands and computes x-coordinates and y-coordinates of the nodes; and
    graphically displaying, on a display device, results of the constrained stress minimization,
    whereby symmetric nodes within a cycle that are assigned to the at least one of the bands are displayed on the display device with one of x-coordinates and y-coordinates of the symmetric nodes all being within the range of coordinates of the at least one of the bands and including different coordinate values.

11. The method as set forth in claim 10, wherein the performing a constrained stress minimization includes selecting a series of quadratic functions and bounding a stress function with the series of quadratic functions.

12. The method as set forth in claim 11, wherein the performing a constrained stress minimization further includes iteratively minimizing linearly constrained quadratic functions.

13. The method as set forth in claim 12, wherein each iteration of the iteratively minimizing linearly constrained quadratic functions decreases stress.

14. The method as set forth in claim 10, wherein the graphically displaying the results of the constrained stress minimization includes graphically displaying a digraph having a plurality of edges, each of the edges colored according to a primary direction of orientation of the edge.

15. The method as set forth in claim 10, the method further comprising:

displaying, on the display device, the bands along a y-axis of the results, each of the bands having a height in a y-direction visually corresponding to the y-coordinates of the nodes.

16. The method as set forth in claim 10, wherein the performing a constrained stress minimization on the data includes performing a minimization of a stress function with a quadratic solver, the quadratic solver being one of MOSEK, CPLEX, OOQP, BQPD, and COPL_QP.

17. The method as set forth in claim 10, wherein the hierarchical constraints include a hierarchy constraint that constrains one of an x-coordinate and a y-coordinate of each of the nodes to be less than a range of coordinates of a preceding band and to be greater than a range of coordinates of a subsequent band.

18. The method as set forth in claim 10, wherein the hierarchical constraints include a gap constraint that defines a gap between ranges of coordinates of consecutive bands, one of the y-coordinates and the x-coordinates of the nodes being outside of the gap.

19. A system for graphically displaying nodes on a display device, the system comprising:

a receiver that receives data associated with the nodes;

an assigner that assigns hierarchical levels to the nodes based on the data associated with the nodes;

a clusterer that clusters the nodes according to the hierarchical levels to assign the nodes to bands, at least one of the bands corresponding to a range of coordinates;

a processor that performs a constrained stress minimization on the data, wherein the constrained stress minimization is subject to hierarchical constraints based on the bands and computes x-coordinates and y-coordinates of the nodes; and a displayer that graphically displays, on a display device, results of the constrained stress minimization, whereby symmetric nodes within a cycle that are assigned to the at least one of the bands are displayed on the display device with one of x-coordinates and y-coordinates of the symmetric nodes all being within the range of coordinates of the at least one of the bands and including different coordinate values.

20. The system as set forth in claim 19, wherein the hierarchical constraints include:

a hierarchy constraint that constrains one of an x-coordinate and a y-coordinate of each of the nodes to be less than a range of coordinates of a preceding band and to be greater than a range of coordinates of a subsequent band; and a gap constraint that defines a gap between ranges of coordinates of consecutive bands, one of the y-coordinates and the x-coordinates of the nodes being outside of the gap.

* * * * *